United States Patent
Liu et al.

(10) Patent No.: US 12,314,761 B2
(45) Date of Patent: May 27, 2025

(54) SYSTEM AND METHOD FOR MEMORY ALLOCATION AND MANAGEMENT IN NON-UNIFORM MEMORY ACCESS ARCHITECTURE COMPUTING ENVIRONMENTS

(71) Applicant: University of Massachusetts, Boston, MA (US)

(72) Inventors: Tongping Liu, Belchertown, MA (US); Hanmei Yang, Amherst, MA (US); Xin Zhao, Amherst, MA (US)

(73) Assignee: University of Massachusetts, Westborough, MA (US)

( * ) Notice: Subject to any disclaimer, the term of this patent is extended or adjusted under 35 U.S.C. 154(b) by 546 days.

(21) Appl. No.: 17/658,733

(22) Filed: Apr. 11, 2022

(65) Prior Publication Data

US 2023/0325239 A1   Oct. 12, 2023

Related U.S. Application Data

(60) Provisional application No. 63/200,062, filed on Feb. 12, 2021.

(51) Int. Cl.
G06F 12/06 (2006.01)
G06F 9/50 (2006.01)
G06F 12/02 (2006.01)

(52) U.S. Cl.
CPC ........ G06F 9/5016 (2013.01); G06F 12/0284 (2013.01); G06F 12/0607 (2013.01); *G06F 2212/2542* (2013.01)

(58) Field of Classification Search
CPC ........ G06F 12/02; G06F 12/06; G06F 9/5016; G06F 12/0284; G06F 12/0607; G06F 2212/254

(Continued)

(56) References Cited

U.S. PATENT DOCUMENTS 7,472,233 B2   12/2008   McKenney et al.
8,245,008 B2   8/2012   Kaminski et al.
(Continued)

FOREIGN PATENT DOCUMENTS

CN   105893269 A   8/2016
WO   WO-2015021316 A1 *   2/2015   ........... G06F 1/3275
(Continued)

OTHER PUBLICATIONS

I. Koutras, I. Anagnostopoulos, A. Bartzas and D. Soudris, "Improving Dynamic Memory Allocation on Many-Core Embedded Systems With Distributed Shared Memory," in IEEE Embedded Systems Letters, vol. 8, No. 3, pp. 57-60, Sep. 2016.*

(Continued)

*Primary Examiner* — Pierre Michel Bataille
(74) *Attorney, Agent, or Firm* — Joshua A. Stockwell, Esq.

(57) ABSTRACT

A system and method for memory allocation and management in non-uniform memory access ("NUMA") architecture computing environments is disclosed. The system and method contemplates both hardware heterogeneity and allocation/deallocation attributes, with fine-grained memory management. NUMAlloc is centered on a binding-based memory management. On top of it, NUMAlloc proposes an "origin-aware memory management" to ensure the locality of memory allocations and deallocations, as well as a method called "incremental sharing" to balance the performance benefits and memory overhead of using transparent huge pages. It further introduced an interleaved heap to reduce the load imbalance among different nodes and an efficient mechanism for object movement. The system and method provides a scalable and increased performance alternative over other prior art memory allocators.

20 Claims, 18 Drawing Sheets

(58) Field of Classification Search
USPC .......................................................... 711/5
See application file for complete search history.

(56) References Cited

U.S. PATENT DOCUMENTS

| | | | |
|---|---|---|---|
| 8,700,838 | B2 | 4/2014 | Gounares |
| 9,026,766 | B2 | 5/2015 | Wang et al. |
| 9,152,468 | B2 | 10/2015 | Waddington et al. |
| 9,183,053 | B2 | 11/2015 | Eidus et al. |
| 9,952,905 | B2 | 4/2018 | Yao |
| 9,977,738 | B2 | 5/2018 | Venkatasubramanian et al. |
| 10,241,674 | B2 | 3/2019 | Eshwarappa et al. |
| 10,552,309 | B2 | 2/2020 | Gschwind |
| 10,705,879 | B2 | 7/2020 | Oshins |
| 10,809,923 | B2 * | 10/2020 | Frank .................. G06F 3/065 |
| 10,963,376 | B2 | 3/2021 | Printezis et al. |
| 2005/0240748 | A1 * | 10/2005 | Yoder ................. G06F 12/023 711/170 |
| 2014/0237197 | A1 * | 8/2014 | Gray .................... G06F 3/061 711/153 |
| 2015/0046732 | A1 * | 2/2015 | Chun ................. G06F 12/0607 713/323 |
| 2016/0371194 | A1 * | 12/2016 | Wagle ................. G06F 9/5016 |
| 2017/0068465 | A1 * | 3/2017 | Schreter ............. G06F 12/023 |
| 2017/0249244 | A1 * | 8/2017 | Gerber ............... G06F 12/0223 |
| 2019/0138441 | A1 * | 5/2019 | Gschwind ........... G06F 9/5016 |

FOREIGN PATENT DOCUMENTS

| | | | | |
|---|---|---|---|---|
| WO | WO-2017142525 | A1 * | 8/2017 | ............ G06F 12/023 |
| WO | WO-2019029236 | A1 * | 2/2019 | ......... G06F 12/0284 |

OTHER PUBLICATIONS

M. Patrou, K. B. Kent, G. W. Dueck, C. Gracie and A. Micic, "NUMA Awareness: Improving Thread and Memory Management," 2018 44th Euromicro Conference on Software Engineering and Advanced Applications (SEAA), Prague, Czech Republic, 2018, pp. 119-123.*

Yang, Zhang • Zhang, Aiqing • Mo, Zeyao, "JArena: Partitioned Shared Memory for NUMA-awareness in Multi-threaded Scientific Applications," Cornell University Library arXiv.org, Feb. 2019.*

Z. Yang, A. Zhang and Z. Mo, "PsmArena: Partitioned shared memory for NUMA-awareness in multithreaded scientific applications," in Tsinghua Science and Technology, vol. 26, No. 3, pp. 287-295, Jun. 2021.*

R. Marotta, M. Ianni, A. Scarselli, A. Pellegrini and F. Quaglia, "NBBS: A Non-Blocking Buddy System for Multi-core Machines," 2019 19th IEEE/ACM International Symposium on Cluster, Cloud and Grid Computing (CCGRID), Larnaca, Cyprus, 2019, pp. 11-20.*

Aigner, Martin at al., "Fast, Multicore-Scalable, Low-Fragmentation Memory Allocation through Large Virtual Memory and Global Data Structures," OOPSLA '15, Oct. 25-30, 2015, Pittsburgh, PA, USA.

Berger, Emory D., et al., "Hoard: A Scalable Memory Allocator for Multithreaded Applications," ASPLOS 2000, Cambridge, MA, Nov. 12-15, 2000.

Hunter, A.H. et al., "Beyond malloc efficiency to fleet efficiency: a hugepage-aware memory allocator," USENIX Association, 257-273, Jul. 14, 2021.

Jemalloc memory allocator, https://jemalloc.net/.

Mimalloc memory allocator, https://github.com/microsoft/mimalloc.

Tcmalloc memory allocator, https://github.com/google/tcmalloc.

Yang, Zhang, et al., "JArena: Partitioned Shared Memory for NUMA-awareness in Multi-threaded Scientic Applications," arXiv, 1902.07590, v1, Feb. 20, 2019.

* cited by examiner

| Apps | Glibc | NUMAlloc w/ THP | NUMAlloc w/o THP | Memory Usage (MB) TCMalloc | TCMalloc-NUMA | jemalloc | TBB | Scalloc | mimalloc |
|---|---|---|---|---|---|---|---|---|---|
| | | | | Large Footprint (> 500MB) | | | | | |
| blackscholes | 615 | 780 | 615 | 635 | 622 | 633 | 615 | 629 | 624 |
| canneal | 888 | 863 | 770 | 841 | 757 | 1286 | 888 | 36148 | 891 |
| dedup | 907 | 1163 | 1097 | 1081 | 971 | 1397 | 909 | 12300 | 1587 |
| facesim | 2625 | 2776 | 2726 | 2911 | 2753 | 3539 | 2628 | 9294 | 3178 |
| freqmine | 1883 | 1475 | 1342 | 1896 | 2574 | 1885 | 1890 | 1918 | 3085 |
| Pbzip2 | 544 | 867 | 823 | 920 | 841 | 1168 | 542 | 5464 | 7187 |
| Pfscan | 522 | 523 | 523 | 536 | 529 | 535 | 522 | 554 | 524 |
| raytrace | 1287 | 1443 | 1429 | 1112 | 1446 | 1266 | 1288 | 15821 | 1392 |
| x264 | 2860 | 3229 | 2721 | 3417 | 3067 | 3722 | 2859 | 5445 | 4086 |
| Normalized Geomean | 1.00 | 1.10 | 1.02 | 1.10 | 1.12 | 1.27 | 1.00 | 4.31 | 1.61 |
| | | | | Small Footprint (< 500MB) | | | | | |
| Aget | 8 | 38 | 4 | 25 | 10 | 92 | 9 | 80 | 6 |
| Apache | 4 | 4 | 4 | 10 | 16 | 10 | 4 | 42 | 4 |
| bodytrack | 34 | 62 | 42 | 98 | 43 | 567 | 35 | 2022 | 47 |
| ferret | 182 | 299 | 217 | 301 | 194 | 668 | 184 | 3381 | 647 |
| fluidanimate | 470 | 546 | 325 | 490 | 486 | 482 | 469 | 5372 | 474 |
| Memcached | 17 | 28 | 18 | 25 | 52 | 41 | 19 | 305 | 32 |
| Mysql | 282 | 418 | 216 | 308 | 511 | 853 | 283 | 685 | 1042 |
| Sqlite3 | 45 | 95 | 81 | 110 | 75 | 143 | 45 | 685 | 109 |
| streamcluster | 112 | 132 | 111 | 157 | 121 | 127 | 112 | 193 | 140 |
| swaptions | 40 | 162 | 13 | 76 | 21 | 541 | 41 | 1817 | 14 |
| vips | 225 | 307 | 287 | 407 | 264 | 772 | 225 | 3677 | 969 |
| Normalized Geomean | 1.00 | 1.78 | 0.90 | 1.82 | 1.41 | 3.77 | 1.03 | 12.50 | 1.54 |
| Total | 13550 | 15210 | 13364 | 15256 | 15353 | 19727 | 13567 | 105147 | 26038 |

Fig. 14

SYSTEM AND METHOD FOR MEMORY ALLOCATION AND MANAGEMENT IN NON-UNIFORM MEMORY ACCESS ARCHITECTURE COMPUTING ENVIRONMENTS

CROSS-REFERENCE TO RELATED APPLICATION

This patent document claims priority to earlier filed U.S. Provisional Patent Application Ser. No. 63/200,062, filed on Feb. 12, 2021, the entire contents of which are incorporated herein by reference.

STATEMENT REGARDING FEDERALLY SPONSORED RESEARCH OR DEVELOPMENT

This invention was made with government support under Grant #2024253 awarded by the National Science Foundation. The government has certain rights in the invention.

BACKGROUND OF THE INVENTION

1. Field of the Invention

The present patent document relates generally to memory management in computer systems having a Non-Uniform Memory Access ("NUMA") architecture, and more particularly to a method and system of managing memory in a NUMA computer system that improves performance and efficiency of the NUMA computer system through fine-grained allocation and deallocation of memory.

2. Background of the Related Art

Referring to FIG. 1, traditional computers use a Uniform Memory Access ("UMA") architecture model where all CPU cores are sharing a single memory controller, where any core can access the memory with the same latency (uniformly). However, the UMA architecture cannot accommodate the hardware trend with the increasing number of cores, since all of them may compete for the same memory controller. Therefore, the performance bottleneck is the memory controller in many-core machines, since a task cannot proceed without getting its necessary data from the memory.

Referring to FIG. 2, the NUMA architecture is proposed to solve the scalability issue, due to its decentralized nature. Instead of making all cores waiting for the same memory controller, the NUMA architecture typically is installed with multiple memory controllers, where a group of CPU cores has its memory controller (called as a node). Due to multiple memory controllers, the contention for the memory controller could be largely reduced and therefore the scalability could be improved correspondingly. Compared to the UMA architecture, the NUMA architecture avoids the bottleneck of using one memory controller, where each node/processor can access its own memory controller concurrently. However, the NUMA architecture also has multiple sources of performance degradations, including cache contention, node imbalance, interconnect congestion, and remote accesses.

Regarding cache contention, the NUMA architecture is prone to cache contention that multiple tasks may compete for the shared cache. Cache contention will introduce more serious performance issue if the data has to be loaded from a remote node.

Regarding node imbalance, when some memory controllers have much more memory accesses than others, it may cause the node imbalance issue. Therefore, some tasks may wait more time for memory accesses, thwarting the whole progress of a multithreaded application.

Referring to FIG. 3, in the NUMA architecture, local nodes can be accessed with less latency than remote accesses. Therefore, it is important to reduce remote accesses to improve the performance.

Referring to FIG. 4, interconnect congestion occurs if some tasks are placed in remote nodes that may use the inter-node interconnection to access their memory. For instance, congestion may occur at points A and B where the interconnect is used.

Node imbalance and interconnect congestion may have a larger performance impact than cache contention and remote accesses. These performance issues cannot be solved by the hardware automatically. Therefore, software support is required to control the placement of tasks, physical pages, and objects to achieve the optimal performance for multithreaded applications. The memory allocator is one such component that could help solve these challenges.

However, general-purpose memory allocators, such as dlmalloc, Hoard, TcMalloc, jemalloc, SuperMalloc, Scalloc, and mimalloc, were designed for symmetric multiprocessing machines. These general-purpose memory allocators do not consider the heterogeneity of the underlying hardware, or have very little developer support. As a result, the NUMA architecture cannot realize its maximum performance, and, in many instances, has impaired performance.

Some memory allocators support the NUMA architecture; however, they still suffer disadvantages that impair the performance of the computer. Among them, the first NUMA-aware memory allocator designed called as TcMalloc-NUMA. TcMalloc-NUMA aims to reduce remote accesses, but without considering interconnect congestion and node imbalance that may also significantly affect the performance. In TcMalloc-NUMA, allocations will be satisfied from a per-thread heap first, and then the freelist of the current node. However, TcMalloc-NUMA has multiple issues that may significantly affect its effectiveness. First, it did not control deallocations of objects. A freed object is always placed into the deallocating thread's local buffer, a mechanism originated from TcMalloc. However, if such an object is originated from a remote node, this clearly will cause unnecessary remote accesses. Second, it did not control the placement of threads: a thread can be migrated to a remote node upon synchronizations or system calls, which not only force this thread to access its stack remotely but also reload all data that are already in the cache of its original node. Further, after the migration, all deallocated objects by this thread will be placed into the new node's freelist afterwards, causing unnecessary remote accesses.

Therefore, there is a perceived need for an improved method of allocating memory in a NUMA architecture computer that minimizes performance degradation of the computer.

SUMMARY OF THE INVENTION

An improved memory allocator ("NUMAlloc") is disclosed that considers both hardware heterogeneity and allocation/deallocation attributes, and utilizes fine-grained memory management in order to improve the performance and operation of a NUMA architecture computing environment, by minimizing performance bottlenecks prevalent in prior art memory allocators. NUMAlloc will not only deal with hardware heterogeneity, but also employs different policies for objects with different attributes, such as shareability, allocation pattern, sizes, and origin. NUMAlloc proposes multiple mechanisms that improve both load balance and locality as detailed in the following.

First, NUMAlloc proposes a binding-based memory management to exploit the benefits of memory and thread binding. In particular, NUMAlloc binds every region of virtual memory and every thread to a physical node, but still allows the OS to perform the scheduling. The bindings enable NUMAlloc to obtain the origin (the physical node) of memory and threads with few instructions inside the user space, which is orders of magnitude lower than invoking system calls (around 10,000 cycles for getting the node of the memory). Therefore, it is infeasible to perform more advanced memory management, as the performance benefits of reducing remote accesses will be canceled out by the cost of getting the origin information via system calls. Further, the binding will eliminate remote accesses caused by thread migrations and ensure the locality for managing metadata.

Second, NUMAlloc ensures the full locality of memory allocations with its origin-aware memory management, built on top of its binding-based mechanism. Memory locality is defined as whether an object is allocated from the local physical node of the requesting thread. Existing NUMA-aware allocators only ensure the locality of every object's first memory allocation. Instead, NUMAlloc additionally ensures the locality of all freed objects, eliminating the confusion caused by memory reuse (a very common behavior). Different from existing work, NUMAlloc guarantees that a freed object will be always placed into a freelist with the same origin as the current thread. That is, an object is returned to the deallocating thread only if the object is originated from the same node that the current thread is running on; otherwise, it will be returned to its original node.

Third, NUMAlloc proposes a new incremental sharing to take advantage of the "Transparent Huge Pages" (THP) of modern OS/hardware. Huge pages are expected to significantly reduce Translation Lookaside Buffer (TLB) misses, as each page table entry could cover a larger range of virtual addresses (e.g., 2 MB instead of 4 KB). However, most existing allocators could not support huge pages, or even require to disable huge pages. Few allocators support huge pages, but with their shortcomings: LLAMA allocates objects on huge pages based on the liveness of objects, but requires expensive analysis and profiling; TEMERAIRE allocates both small and big objects from huge pages, but without sharing huge pages between different threads, possibly due to no node information of threads. That is, mistakenly letting two remote threads share the same huge page may impose some performance degradation. In contrast, NUMAlloc enables the sharing of huge pages among different threads with different size classes running on the same physical node, based on the explicit thread binding. The proposed work supports the "incremental sharing" that each thread will get few objects at a time, instead of one whole huge page, in order to reduce memory consumption. In order to make the OS use huge pages inherently, NUMAlloc maps a large region of memory (larger than the size of a huge page) for each node initially. Overall, NUMAlloc combines the best of both worlds that it takes the performance advantage of huge pages but does not compromise its memory consumption.

Fourth, NUMAlloc further proposes an interleaved heap that its physical pages are allocated from different physical nodes in an interleaved way, which reduces load imbalance for the initial node that the main thread is running on. This is inspired by profiling tools, which discovered that shared objects allocated in the initial thread are the most common source of performance degradation. The default first-touch policy will allocate all shared objects of the main thread in the initial node, while concurrent accesses from multiple children threads will make this node the performance bottleneck. To resolve this issue, NUMAlloc performs a fine-grained management based on the type and the phase of an allocation: only potentially-shared objects of the initial/main thread (and before creating children threads) will be allocated from the interleaved heap, which helps distribute concurrent accesses from children threads to all nodes.

NUMAlloc is also implemented carefully to achieve good performance. NUMAlloc designs an efficient mechanism to move objects between per-thread freelists and per-node freelists, without traversing all objects in the freelists as TcMalloc. It also reduces memory consumption of huge pages by making multiple threads share the same bag, overcoming one issue of Scalloc. It allocates the metadata on the local nodes in order to further reduce unnecessary remote accesses. We have performed extensive evaluation on synthetic and real applications, and compared NUMAlloc with popular allocators, such as the default Linux allocator, TcMalloc, jemalloc, Intel TBB, and Scalloc. NUMAlloc achieves around 17% speedup comparing to the default Linux allocator, which is also 15% faster than the second-best one (mimalloc). For the best case, NUMAlloc runs up to 6.8 times faster than Scalloc, and 2.9 times faster than the default Linux allocator. NUMAlloc is much more scalable than other allocators based on our evaluation. NUMAlloc is ready for practical employment, due to its high performance and good scalability.

Accordingly, among the objects of the improved NUMA computing system described herein, is the provision for a fine-grained memory management that considers both hardware heterogeneity and different allocation/deallocation attributes.

Another object of the improved NUMA computer system described herein, is the provision for a memory manager that provides a binding-based memory management and origin-aware memory management to ensure locality of both repeated and new memory allocations; and Another object of the improved NUMA computer system described herein, is the provision for a memory manager that reduces node imbalance, including an interleaved heap and incremental sharing of transparent huge pages to overcome the large memory consumption, while keeping the associated benefits thereof.

BRIEF DESCRIPTION OF THE DRAWINGS

These and other features, aspects, and advantages of the present invention will become better understood with reference to the following description, appended claims, and accompanying drawings where:

FIG. 9 shows a diagram of a method of origin-aware memory allocation in a NUMA architecture computing environment where the allocation requests are satisfied in the same node as the thread is running on;

FIG. 14 shows a table illustrating memory usage of a memory allocator designed according the present method and system described herein compared to prior art memory allocators for NUMA architecture computing environments;

DESCRIPTION OF THE PREFERRED EMBODIMENT

Figure 1:
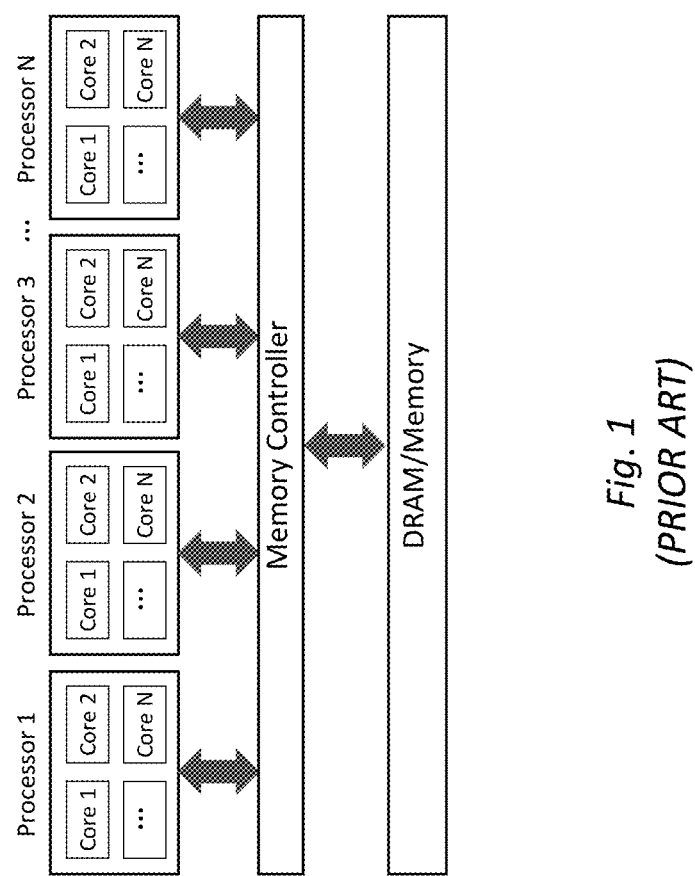
FIG. 1 shows a diagram of a prior art UMA architecture computing environment.
Figure 2:
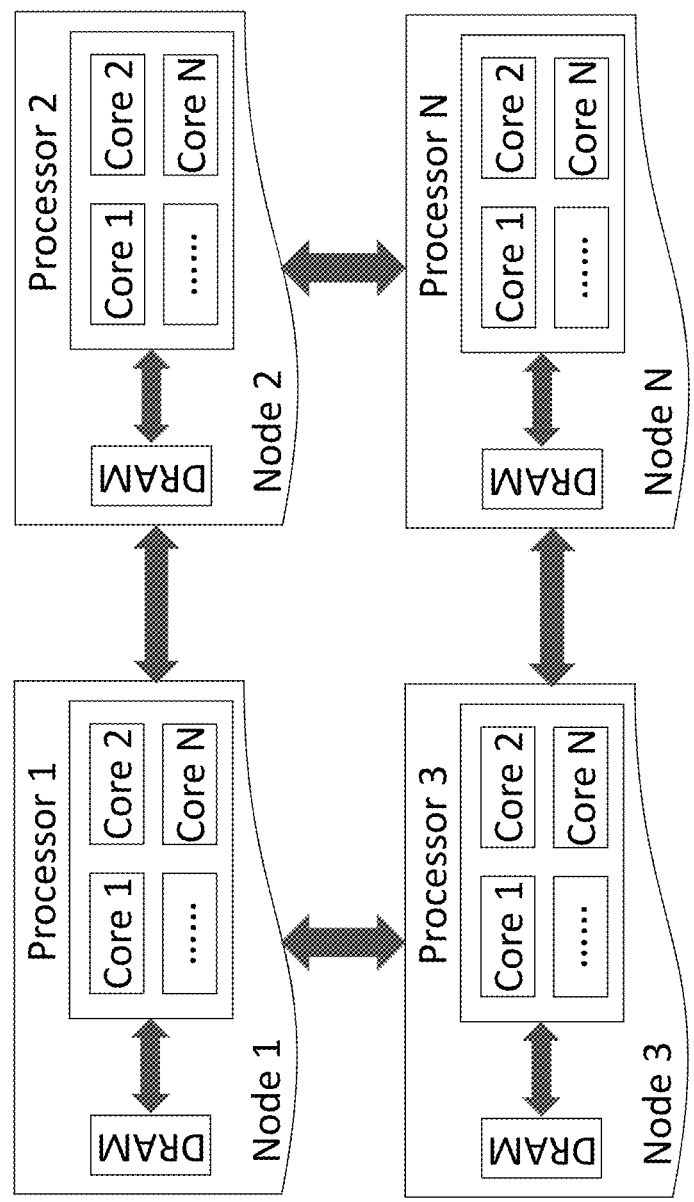
FIG. 2 shows a diagram of a prior art NUMA architecture computing environment.
Figure 3:
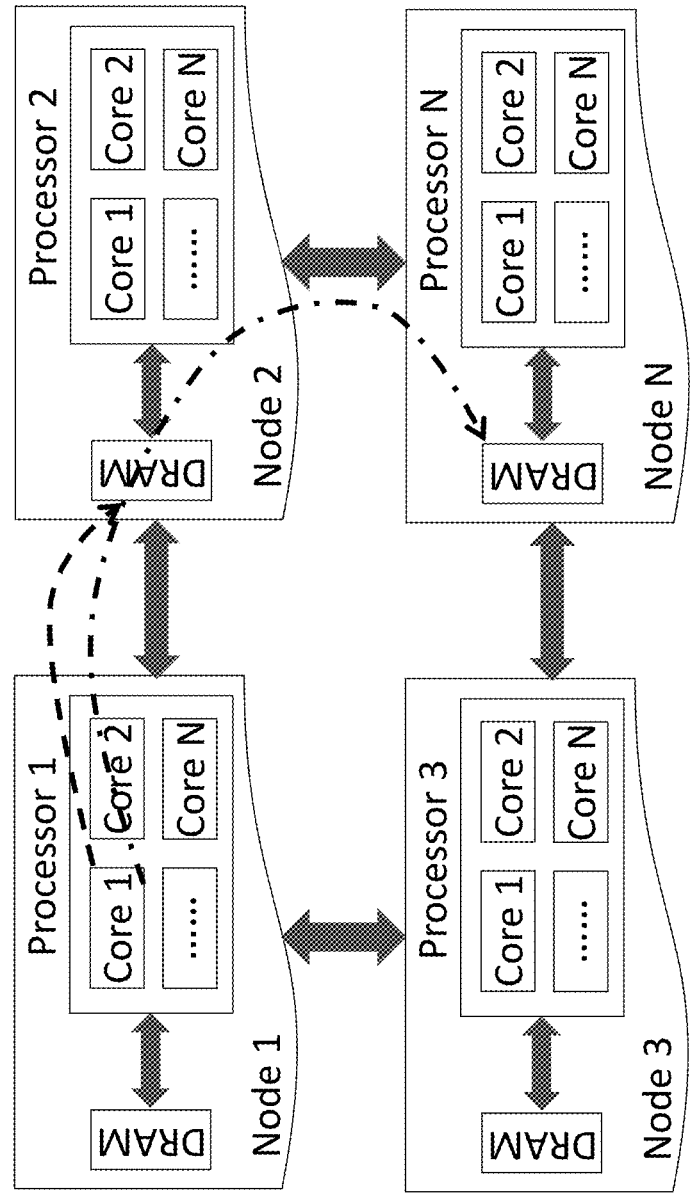
FIG. 3 shows a diagram of a prior art NUMA architecture computing environment where undesirable remote accesses are occurring.
Figure 4:
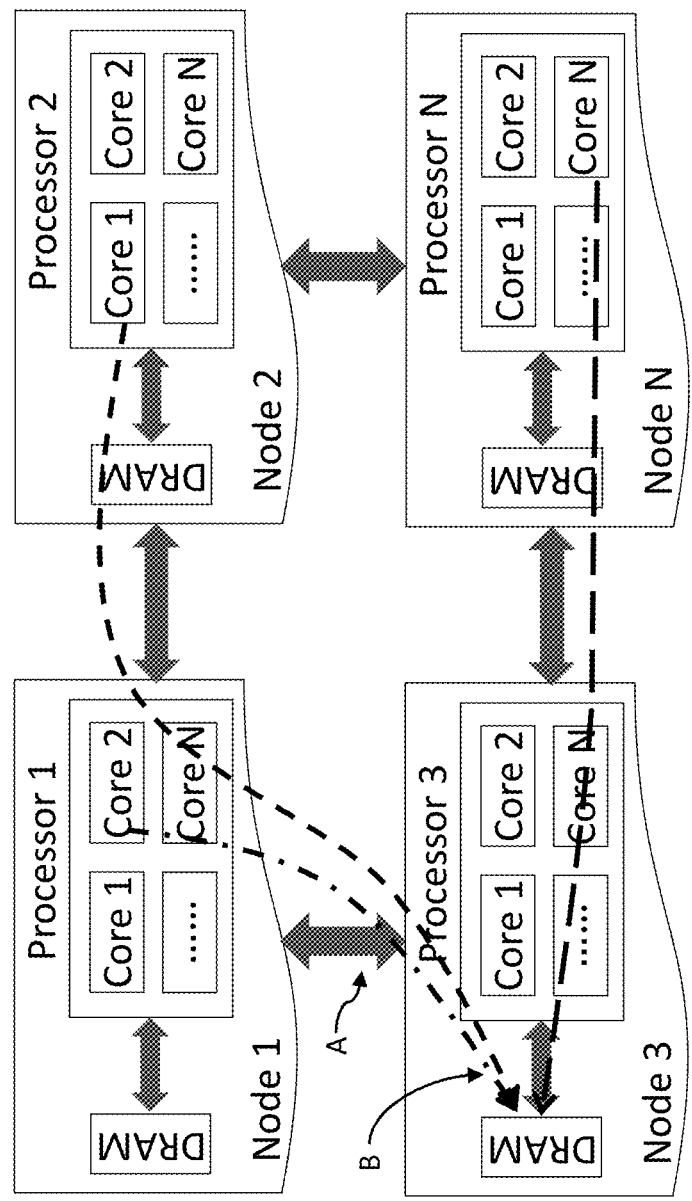
FIG. 4 shows a diagram of a prior art NUMA architecture computing environment where undesirable bottlenecks in remote accesses are occurring.

NUMAlloc is designed as a replacement for the default memory allocator. It intercepts all memory allocation/deallocation invocations via the preloading mechanism, and redirects them to NUMAlloc's implementation. Therefore, there is no need to change the source code of applications, and there is no need to use a custom operating system ("OS") or hardware. Accordingly, the system and method described herein may be implemented across a wide variety of computing environments that implement the NUMA architecture, and one skilled in the art will be able to adapt the techniques described herein accordingly to achieve significant performance improvements over prior art memory allocators used in existing NUMA computing environments.

In one embodiment, the system and method provides a computer-implemented method comprising steps to determine the topology of the NUMA computing environment; reserve a continuous range of memory for heap objects, the range of memory comprising a plurality of addressable memory pages; divide the range of memory into an even number of blocks corresponding to the number of the plurality of nodes in the NUMA environment, and bind each block to each node. Memory allocations and deallocations are managed together in order to ensure local allocations to each of the plurality of nodes for each thread.

In another embodiment, the system and method further comprises a computer-implemented method for maintaining a per-thread freelist and a per-node freelist of heap objects that have been deallocated for each of said plurality of nodes, where the per-node freelist further comprises a range of memory never allocated.

In another embodiment, the system and method further comprises a computer-implemented method for reserving a continuous range of memory for shared objects; each range of memory comprising a plurality of addressable memory pages; interleavedly binding the plurality of addressable memory pages to the plurality of nodes; and maintaining a shared-object list of shared objects allocated in the range of memory of shared objects.

In another embodiment, the system and method further comprises a computer-implemented method for receiving an allocation request of memory from one thread running on the plurality of nodes of the NUMA environment; computing the size class of the memory allocation request received; checking the per-thread freelist for deallocated objects of the node requesting memory, and if not empty, allocating an object therefrom; if the per-thread freelist is empty, checking the per-node freelist for deallocated objects, and if not empty, moving at least a number of objects corresponding to the class size of the memory allocation request from the per-node freelist to the per-thread freelist; and if the per-node freelist is empty, allocating at least a number of objects corresponding to the class size of the memory allocation request from the never-allocated range of memory of the per-node freelist.

In another embodiment, the system and method further comprises a computer-implemented method for receiving a deallocation request of memory for an object from one of the plurality of nodes of the NUMA environment; computing the origin of an object to be deallocated, and if not originating from the same node, adding this object to the per-node freelist of the node that the memory block is bound to; computing the origin of the object to be deallocated, and if originating from the same node, adding this object to the per-thread freelist; and checking the number of shared objects in the per-thread freelist of the node, and moving one or more shared objects from the per-thread freelist to the per-node freelist if the number exceeds a pre-defined threshold.

In another embodiment, the system and method further comprises a computer-implemented method for intercepting a plurality of thread-creation requests from an operating system of the NUMA computing environment; and interleavedly binding each of the plurality of thread-creation requests to each of the plurality of nodes; and maintaining a balance of threads among the plurality of nodes.

In another embodiment, the system and method further comprises a computer-implemented method for a) receiving an allocation request for memory from one thread running on one of the plurality of nodes of the NUMA environment; b) determining whether the allocation request is for a shared object or a private object; and c) allocating memory from one of the range of memory for heap objects and the range of memory for shared objects based on the determination reached in step b).

In yet another embodiment, the system and method further comprises a computer-implemented method for determining a size of an allocation request; predicting a frequency of an allocation request; and allocating a huge page if the size of the allocation request or the predicted frequency of the allocation requests exceeds pre-defined thresholds.

Figure 5:
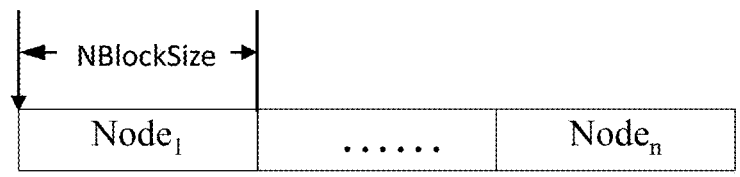
FIG. 5 shows a diagram of a method of reserving and binding memory for future memory allocations according to the system and method for memory allocation and management in NUMA architecture computing environments.

Referring to FIG. 5, NUMAlloc requests a large and continuous region from the underlying OS initially, and then divides it evenly into multiple regions based on the number of hardware nodes. Each small region is bound to a different physical node via mbind system call, which ensures that all physical pages from this node will be allocated from a specific node. In particular, the first region is bound to the first node, the second one is bound to the second node, and so on. This design enables to compute the physical node quickly from a memory address: we could compute the index of physical node by dividing the heap offset with the region size.

Figure 6:
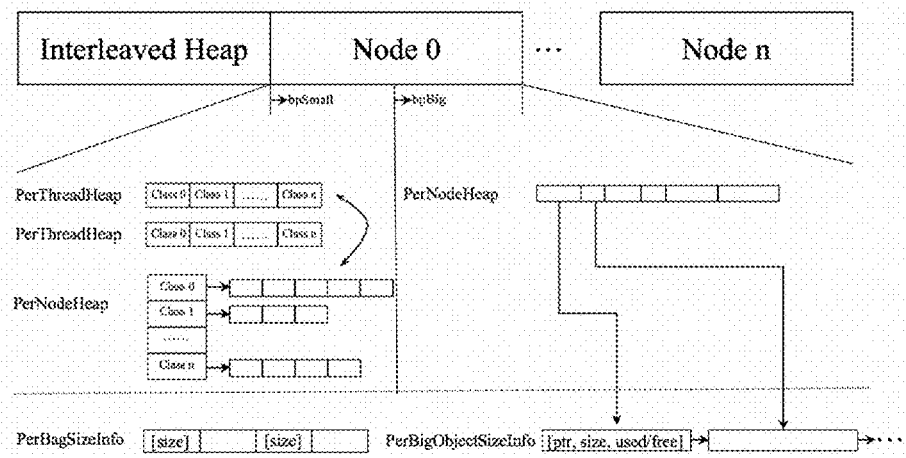
FIG. 6 shows a diagram of the organization and management of an interleaved and pernode heap according to the system and method for memory allocation and management in NUMA architecture computing environments.

NUMAlloc proposes an origin-aware memory management that should check the origin of every object upon deallocation. In order to support fast checking, NUMAlloc's heap layout is shown in FIG. 6. Each aspect of the interleaved heap will be further described below.

NUMAlloc also manages small and big objects differently. Small objects are organized by size classes, and each request will be satisfied from a particular size class. NUMAlloc utilizes fine-grained size classes for small objects, such as 16 bytes apart for objects less than 128 bytes, and 32 bytes apart for objects between 128 bytes and 256 bytes, then power-of-2 sizes afterwards. In NUMAlloc's design, big objects are those ones with the size larger than 512K, which are typically aligned up to megabytes. In the heap layout of FIG. 6, each region will be further divided into two sub-regions, one for small objects, and one for big objects. The bpSmall pointer is utilized to track never-allocated small objects, and big ones are tracked with bpBig pointer.

For small objects, NUMAlloc utilizes a "Big-Bag-of-Pages" (BiBOP) methodology that all objects in the same bag (32 KB by default) will have the same size class. In order to improve the reliability, NUMAlloc tracks the size information of small objects in a separate area (shown as "PerBagSizeInfo" of FIG. 6). For big objects, they utilize a linked list called "PerBigObjectSizeInfo" to store the size and availability information. This data structure also includes the used/free information for big objects, which allows to coalesce multiple continuous big objects into a bigger object upon deallocations. Since the size information for big objects is always larger than 1 MB, NUMAlloc utilizes its lowest significant bit to encode the availability information.

Typically, freed objects of the same size class will be tracked on one freelist. In order to further reduce the contention, NUMAlloc employs per-thread heap that maintains a freelist for each size class. Advantageously, NUMAlloc will not need any synchronization for allocations and deallocations from per-thread freelists, since it is impossible for two threads to share the same per-thread heap.

In order to support the NUMA architecture, a PerNodeHeap is proposed that has one freelist for each size class and one common freelist to track all freed big objects allocated from the current node. This design is different from TcMalloc-NUMA. The relationship between per-thread freelist and per-node freelist is discussed further below.

Overall, NUMAlloc's heap layout has the following novelties, including a novel layout to quickly compute the physical node (with the memory binding) and a per-node heap to support node-aware allocations.

Figure 10:
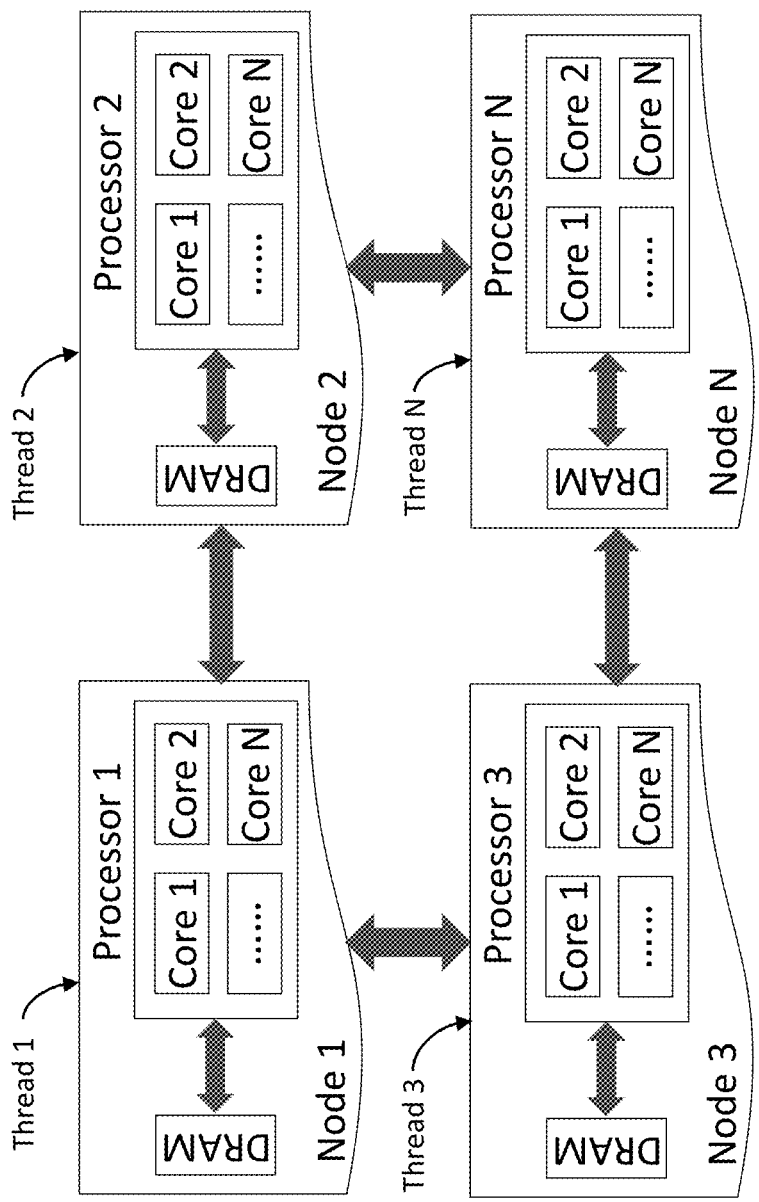
FIG. 10 shows a diagram of a method of binding threads to nodes in a NUMA architecture computing environment where a balance of threads is maintained between the nodes in order to reduce undesirable load imbalances.

Referring to FIG. 10, thread migration will cause multiple performance issues for the NUMA architecture. Therefore, in one embodiment NUMAlloc binds each thread to a node specifically in order to avoid thread migration cross different nodes. NUMAlloc currently supports two types of binding, node-interleaved binding and node-saturate binding. Node-interleaved binding binds continuous threads to different nodes in an interleaved way so that every node will have a similar number of threads. That is, the first thread will be bound to the node that it is scheduled to run by the OS, and the second thread will be bound to its next node, and so on. Instead, the node-saturate binding will bind sufficient threads to a node first before binding to a different node. For node-saturate binding, threads to be assigned will be the same as the number of hardware cores. NUMAlloc will use node-interleaved binding by default, as it has a better performance based on our evaluation. But users could switch to the node-saturate binding by controlling the environment variable.

Note that NUMAlloc only binds a thread to a node, instead of a core, which still allows the scheduling initiated by the OS. To perform the binding correctly, NUMAlloc obtains the hardware topology in the initialization phase via the numa_node_to_cpus API, which tells the relationship between each CPU core and each memory node. Then it intercepts all thread creations in order to bind a newly-created thread to a specific node.

NUMAlloc includes an origin-computable design that could quickly determine the origin of each object via the computation.

Figure 7:
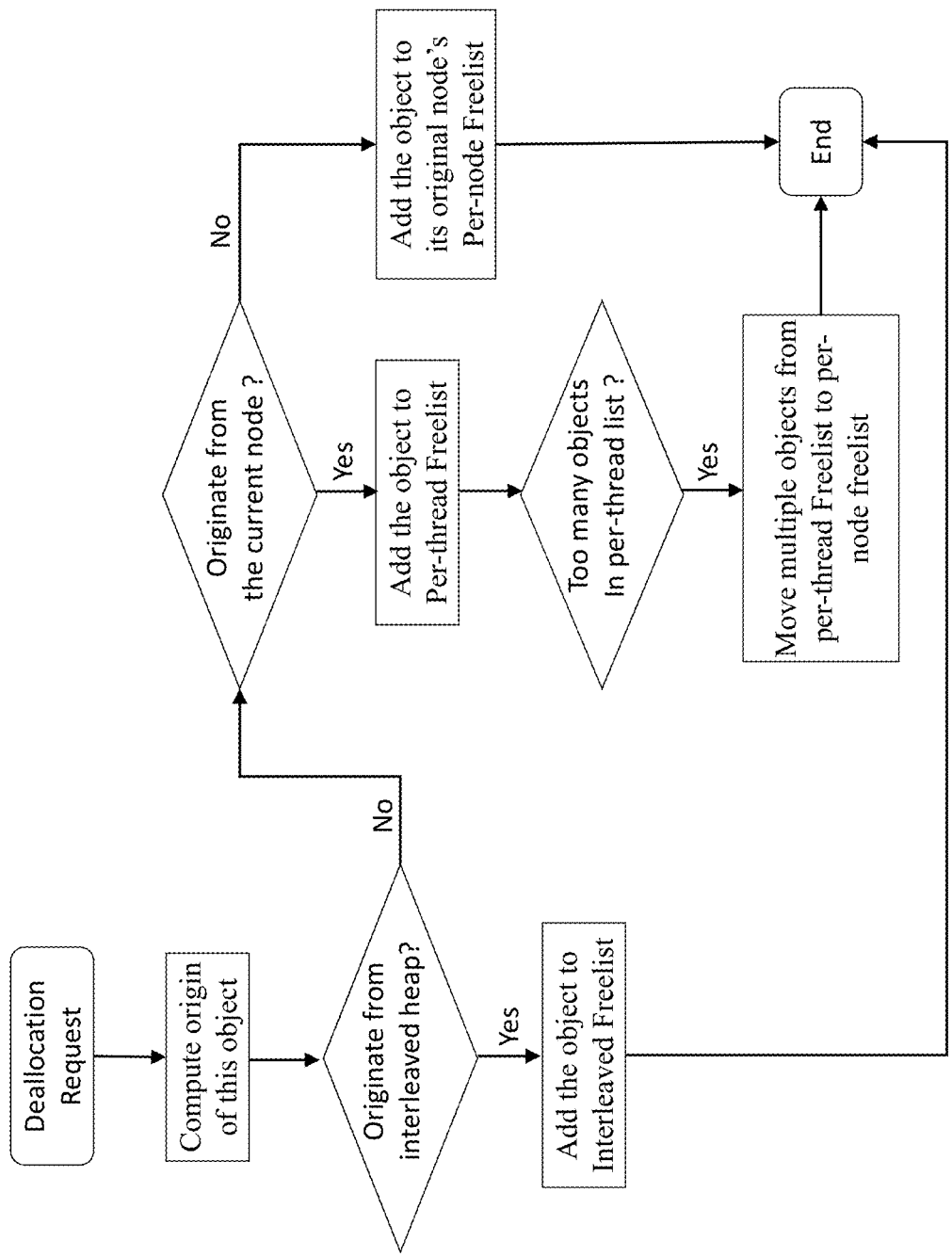
FIG. 7 shows a flowchart illustrating the deallocation of memory according to the system and method for memory allocation and management in NUMA architecture computing environments.

Referring to FIG. 7, NUMAlloc includes an origin-aware deallocation that will always return a freed object to a freelist with the same origin. If a freed object is not originated from the same node, it will be returned to its originated node's freelist. Otherwise, there are two possible freelists for such an object. One is a node-based freelist, and another is the per-thread freelist of the deallocating thread since a thread is never migrated to a different node. Therefore, the per-thread freelist will be a better candidate, since there is no need for any synchronization overhead. That is, different with all existing work, a freed object will be only returned into the per-thread list if the object is originated from the current node. NUMAlloc considers both the originality and the performance upon deallocations.

Figure 8:
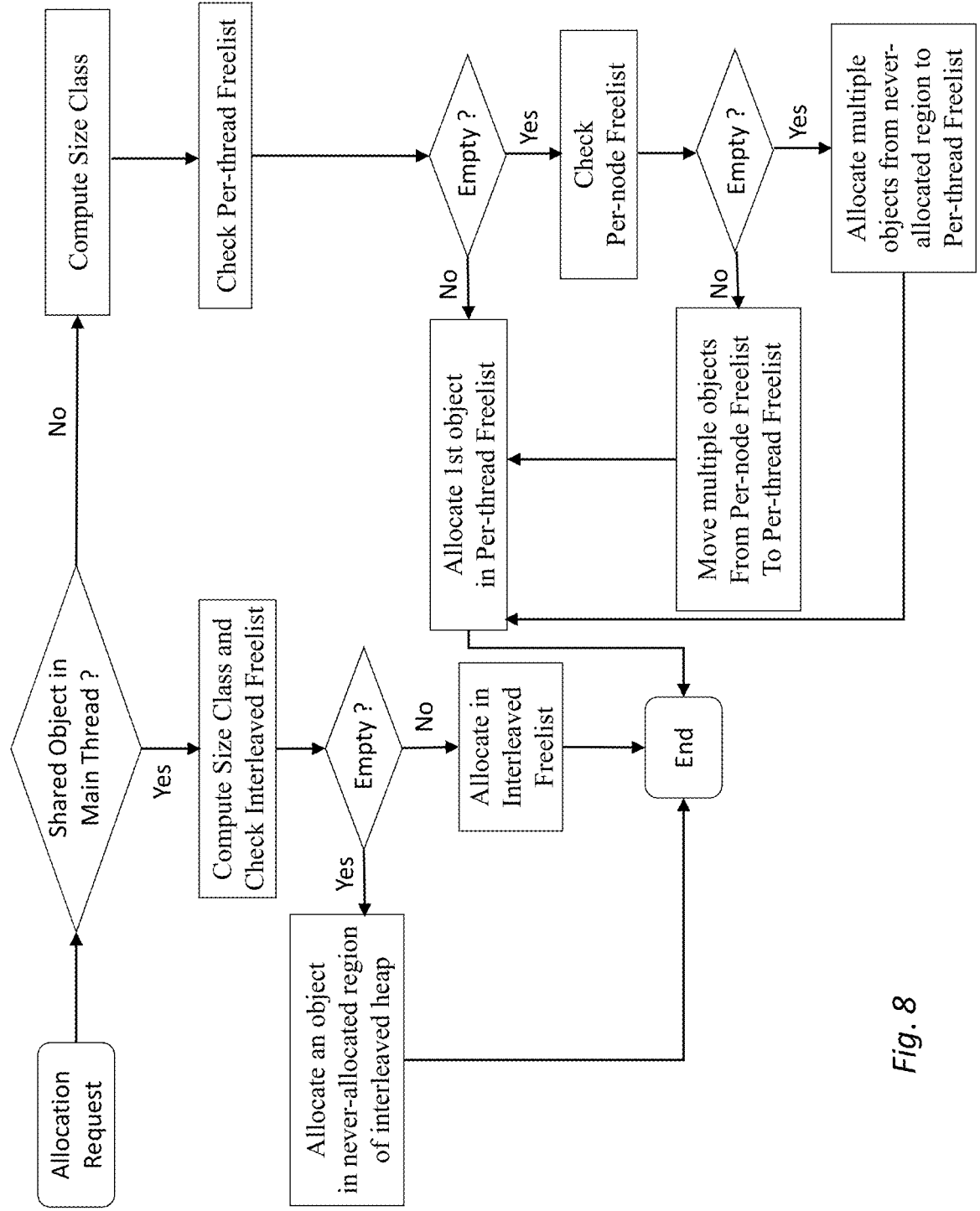
FIG. 8 shows a flowchart illustrating the allocation of memory according to the system and method for memory allocation and management in NUMA architecture computing environments.
Figure 9:
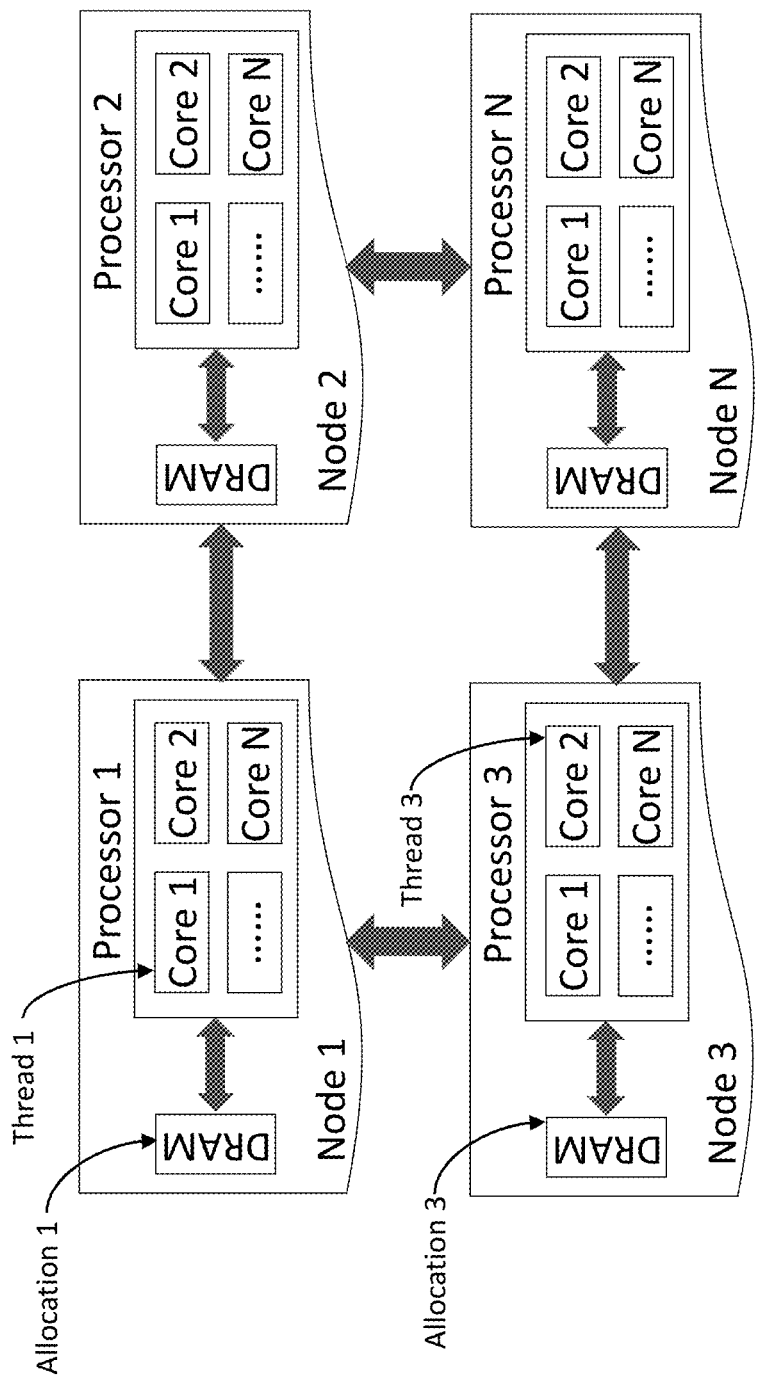

Referring to FIG. 8, NUMAlloc always ensures node-local memory allocations with the following order for small objects: the per-thread's freelist will be checked first, since there is no need to acquire any lock and there is a high chance that the object is still hot in the cache; The current node's freelist will be checked secondly; The last step is to allocate the memory from the current node's unallocated region, if the previous two steps failed. Since the region has been bound to the current node and objects in the per-thread freelist and the per-node freelist are always originated from the current node, NUMAlloc ensures local allocations, as shown in FIG. 9. For instance, an allocation request received from a thread, Thread 1, running on Processor 1 will be filled at the memory at Node 1 at Allocation 1, and an allocation request received from a thread, Thread 3, running on Processor 3 will be filled at the memory at Node 3 at Allocation 3. For big objects, freed objects will be tracked in its per-node freelist. Therefore, all allocations will be satisfied from per-node freelist first and then from pbBig pointer (tracking un-allocated region).

Most NUMA performances issues identified by existing NUMA profilers are related to shared objects that are typically allocated in the main thread. Due to the default first-touch policy, objects allocated and touched by the main thread are typically allocated in the first node that the main thread is running on. However, this method could easily cause the load imbalance issue, if such objects are passed to multiple children threads: the memory controller of this node will be concurrently accessed by multiple threads, leading to the performance bottleneck on this node. To overcome this issue, NUMAlloc reserves a range of memory for such objects, called as "Interleaved Heap" in FIG. 6. NUMAlloc utilizes the mbind system call to specify that physical pages of this heap will be allocated from all nodes interleavedly. With this design, then all threads can access shared objects allocated in the main thread concurrently, reducing interconnect congestion and load imbalance of a central node.

Note that the interleaved heap cannot be achieved by using existing NUMA utilities like numactl. Although numactl could also specify memory allocations to be an interleave policy. But that could only set for a whole application. Instead, NUMAlloc only utilizes the interleaved heap for shared objects that are allocated in the main thread, with its fine-grained memory management. The interleaved heap is beneficial to the performance for most applications, but not all applications, especially when an application spends a long time in its serial phase. Therefore, the interleaved heap is provided as an option that can be enabled whenever necessary.

When THP is enabled, the OS will prefer to allocate huge pages if a program touches a continuous memory region with the size larger than a huge page (e.g., 2 MB). Since allocates a large region NUMAlloc initially (referring to FIG. 6), huge pages will be employed by the OS correspondingly. However, it is important to reduce memory fragmentation, as one allocation from a memory block will be assigned to a huge page. NUMAlloc makes multiple threads (from the same node) share the same memory block, instead of having a separate super-block for each thread as Scalloc and TEMERAIRE. That is, when a thread is running out of memory, it obtains only multiple objects at a time (currently 32 KB) from the corresponding memory block, instead of getting few megabytes for each per-thread heap. For small objects larger than 32 KB (but less than 512 KB), each thread will get only one object at a time, by aligning to 32 KB as well. This is why it is called "incremental sharing". NUMAlloc allocates objects with different size classes to share the same huge page, to further reduce the memory fragmentation.

During the implementation, we observe that NUMAlloc actually will utilize huge pages for metadata, which may introduce unnecessary memory overhead since it only needs 8 bytes for "PerBagSizeInfo" used internally by NUMAlloc. To get rid of this overhead, we leverage the madvise system call to make the metadata memory allocate from normal pages. These are the basic reasons that NUMAlloc has much less memory consumption than Scalloc.

NUMAlloc also implements the following mechanisms in order to reduce the performance and memory overhead for object migration, management of metadata, reducing memory waste, and cache warmup.

Regarding efficient object migration, it is important to reduce memory blowup that freed objects by one thread cannot be utilized by other ones. NUMAlloc will move freed objects between per-thread and per-node freelists. On the one hand, when a per-thread freelist has too many freed objects, some should be moved to the per-node freelist so that other threads could re-utilize these freed objects. On the other hand, each per-thread list needs to obtain freed objects from its per-node heap, when a thread is running out of the memory.

A straightforward method is to traverse the freelist to collect a specified number objects, and then moves all of them at a time in order to reduce the synchronization overhead. Both TcMalloc and TcMalloc-NUMA utilize this mechanism, which has the following issues. First, traversing the freed objects of a freelist will actually bring the first lines of these objects to the cache, since the first word of each freed object is used as the pointer for the freelist. This traverse will pollute the cache of the current thread, especially when a thread is moving these objects out. Second, the migration will always migrate recently-freed objects, due to the use of singly-linked list. This method is not good for the performance when moving objects from a per-thread freelist to the per-node freelist, since recently-freed objects are still hot in the cache. Then a thread will be forced to utilize objects that are not in the cache. Third, the traverse of a global freelist may introduce significant lock contention, when multiple threads are migrating freed objects from the per-node freelist concurrently.

Figure 11:
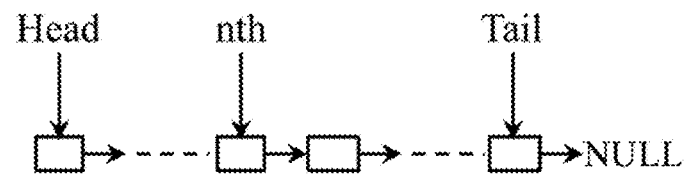
FIG. 11 shows a first data structure to avoid traversing the perThread freelist during thread migration operations.

NUMAlloc proposes two data structures to avoid these issues. First, each per-thread freelist maintains two pointers that pointing to the least recent object (shown as the Tail pointer) and the nth object separately (shown as nth), as shown in FIG. 11. Each freelist has a header pointer pointing to the most recent object, shown as Header, which will be updated upon adding or deleting an object. This structure avoids the traverse of the freelist during the migration, and allows the movement of the least-freed objects (between (n+1)th and Tail) to the per-node freelist. After the migration, the Tail pointer will be set to the original nth object.

Figure 12:
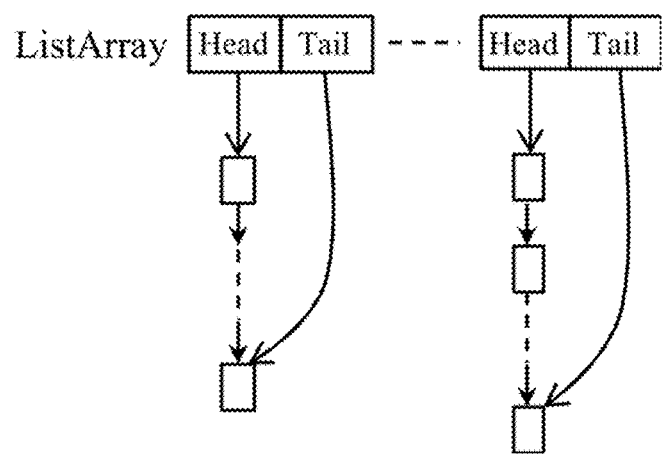
FIG. 12 shows a second data structure to avoid bottlenecks at the perNode freelist during thread allocation, deallocation and retrieval operations.

Second, NUMAlloc avoids the bottleneck of the per-node freelist with a circular array as shown in FIG. 12. Each entry of the circular array has two pointers, Head and Tail separately. Each per-node freelist has three types of operations that can be greatly reduced with this data structure. First, a remote thread will put a freed object into the freelist, based on the origin-aware deallocation. This operation can be done in a constant time, by putting the object into the entry pointed by a toPut pointer. Second, a local thread maybe put multiple objects into it, which can be finished in constant time as well. All objects will be putted to the entry pointed by a toPut pointer, and then the pointer will be updated to the next entry. Third, the operations for getting objects from it can be done efficiently by simply move all objects in the current entry, since there is no need to traverse the freelist. Therefore, this data structure reduces the synchronization issue of all operations.

Regarding the issue of node-local metadata, NUMAlloc guarantees that all of the metadata is always allocated in the same node, based on its thread binding as described above. Such metadata includes per-node and per-thread freelists for different size classes, and freelists for big objects. Similarly, NUMAlloc utilizes the mbind system call to bind the memory to a specific node.

Regarding the issue of reducing memory waste, NUMAlloc utilizes multiple mechanisms to reduce memory wastes. First, if a thread exits, then all memory will be utilized by a new thread. Second, NUMAlloc reduces memory wastes when transparent huge pages are employed. Multiple threads in the same node will share the same bag (for the same size class), instead of having a separate bag for each thread. That is, when a thread is running out of the memory, it obtains multiple objects at a time from the corresponding bag, typically in a granularity of a small page, instead of getting a new bag. This mechanism reduces most of memory consumption, with the transparent huge page support by default. Third, NUMAlloc makes metadata allocated from normal pages, which further reduces the memory consumption comes from huge pages.

Regarding the issue of cache warmup, NUMAlloc inserts all objects in a page into the freelists, if there is no objects in the perthread freelist. Inserting multiple objects into the freelist will benefit data prefetches, since the insertion is a simple and predictable pattern. With this mechanism, raytrace improves the performance by 10% for example.

Experimental Evaluation

This section aims to answer the following research questions:
a. Performance: How is NUMAlloc's performance, comparing to existing general allocators and NUMA-aware allocators?
b. Memory Consumption: What is the memory consumption of NUMAlloc?
c. Scalability: How is the scalability of NUMAlloc?
d. Design Decisions: How important can every design choice actually impact the performance of NUMAlloc?

Experimental Setup: NUMAlloc was evaluated on a machine with 8 nodes with 128 cores in total. Any two nodes are less than or equal to 3 hops, where the latency of two hops and three hops is 2.1 and 3.1 separately if the latency of local accesses is 1.0. The machine is installed with 512 GB memory. The underlying OS is Linux Debian 10 and the compiler is GCC-8.3.0. For the evaluation, the hyperthreading was turned off. The performance data shown is the average of 10 runs, in order to avoid any bias caused by unexpected events.

NUMAlloc was compared with multiple popular allocators, such as the default Linux allocator, TcMalloc-2.7, TcMalloc-NUMA, jemalloc-jemalloc-5.2.1, Intel TBB-2020.1, Scalloc-1.0.0, and mimalloc. Among them, TcMalloc, jemalloc, TBB, and mimalloc are commercial allocators designed and maintained by Industrial Giants, like Google, Facebook, Intel, and Microsoft.

Note that we are comparing against TcMalloc's NUMA awareness version (released in July 2021), and the newest version of TBB with NUMA support (released in December 2021). Note that the evaluated TcMalloc already includes TEMERAIRE's huge page support.

Multithreaded applications chosen to evaluate the performance include PARSEC applications, and seven real applications like Apache httpd-2.4.35, MySQL-5.7.15, Memcached-1.4.25, SQLite-3.12.0, Aget, Pfscan, and Pbzip2. PARSEC applications are using native inputs. For MySQL, sysbench was used with 128 threads separately, each issuing 100,000 requests. The python-memcached script is used to exercise Memcached, with 3000 loops to get the sufficient runtime. The ab is used to test Apache server, by sending 1,000,000 requests in total. Aget is tested by downloading a 30-MB file, and Pfscan is tested by searching a keyword in a 500 MB data. In terms of Pbzip2, we test it by compressing 10 files with 30 MB each. Finally, SQLite is tested through a program called threadtest3.

Figure 13:
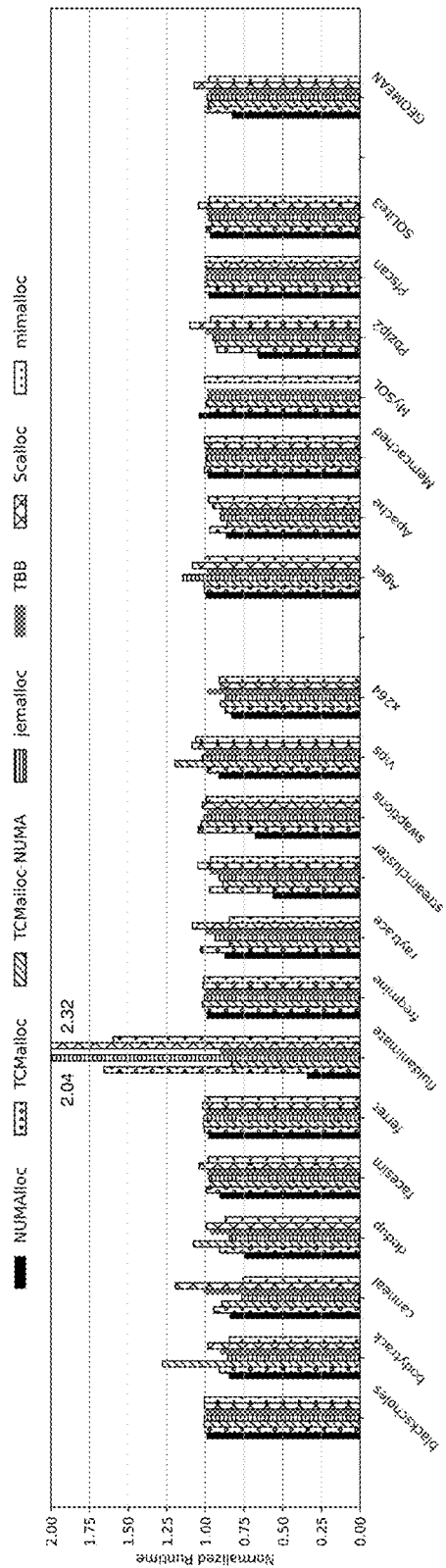
FIG. 13 shows a chart illustrating performance results of a memory allocator designed according the present method and system compared to prior art memory allocators for NUMA architecture computing environments.

The performance results can be seen in FIG. 13, where the runtime of each allocator is normalized to that of the Linux's default one. NUMAlloc is configured without the interleaved heap support for most applications, except for fluidanimate and streamcluster. As evaluated in the following, the interleaved heap will significantly improve the performance for these two applications.

Overall, NUMAlloc has the best performance among these allocators. In particular, NUMAlloc is running 15.2% faster than the second-best allocator (mimalloc), and 17.1% faster than the default Linux allocator. For the best case (e.g., fluidanimate), NUMAlloc is running up to 2.9 times faster than the default Linux allocator, and 6.8 times faster than Scalloc. On average, NUMAlloc is 17.2%, 15.4%, and 15.5% faster than TcMalloc, TcMalloc-NUMA, Intel TBB.

Figure 20:
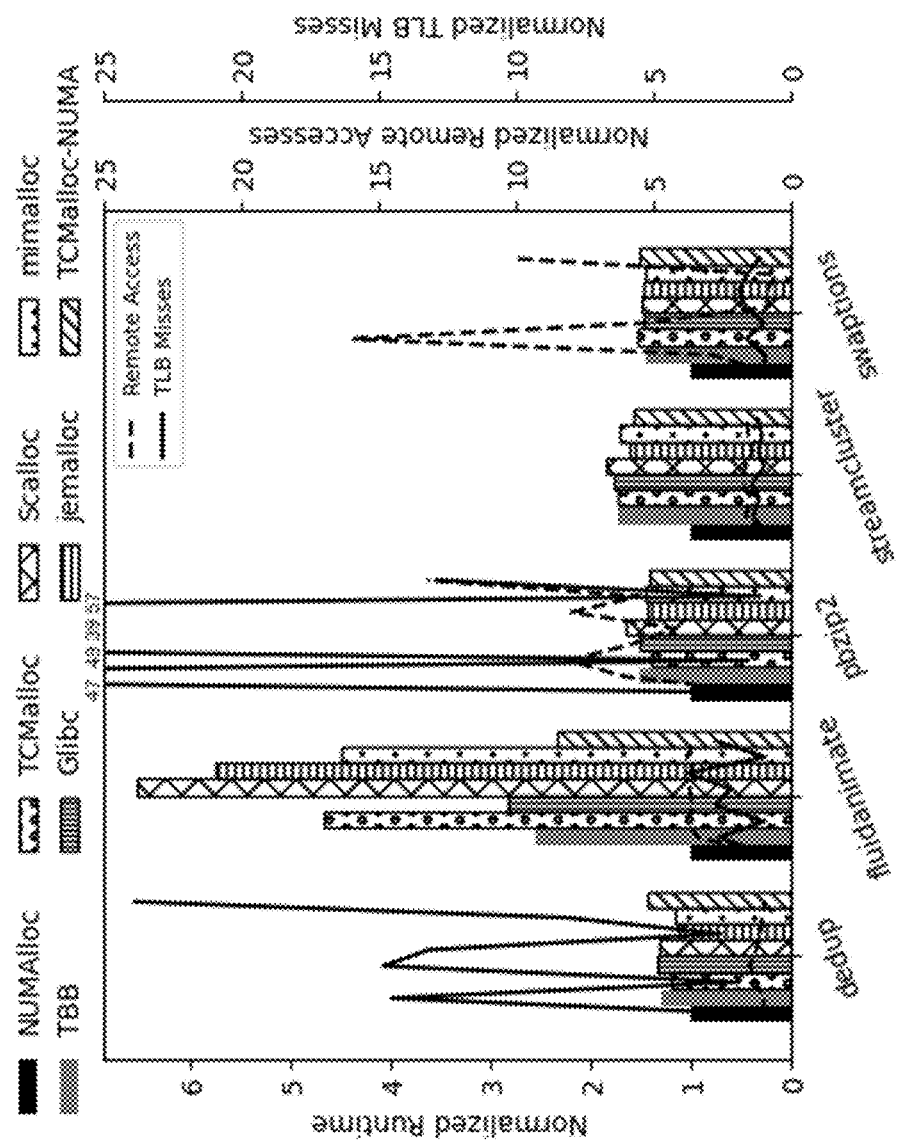
FIG. 20 shows a chart illustrating the normalized runtime, remote accesses, and TLB misses according the present method and system compared to prior art memory allocators for NUMA architecture computing environments.

Referring to FIG. 13, NUMAlloc has a significant performance improvement (over 25%) in the following applications, including dedup, fluidanimate, pbzip2, streamcluster, and swaptions. For these applications, we further examine the number of remote accesses and TLB misses to confirm whether NUMAlloc significantly reduces them. We utilize the perf to collect these numbers. The results are shown in FIG. 20, which includes the performance (shown as bars), remote accesses (dash lines), and TLB misses (solid lines) together for a better comparison. Overall, NUMAlloc has either a lower number of remote accesses or TLB misses than other allocators, which explains why NUMAlloc is the fastest on these applications. We also notice that both NUMAlloc and TcMalloc have a lower number of TLB misses, as they have the support for huge pages.

NUMAlloc significantly reduces the number of remote accesses for three applications, fluidanimate, pbzip2, and streamcluster. Let us utilize fluidanimate as an example, where NUMAlloc is running 2.8× faster than the default Linux allocator and 4.6× faster than TcMalloc. FIG. 20 shows that the number of remote accesses for the default allocator and TcMalloc is 3.6× and 3.8× more than NUMAlloc. However, there is no much difference in the number of remote accesses for dedup and swaptions compared with some allocators. Based on our investigation, NUMAlloc is running faster than others due to the reduction of TLB misses instead.

NUMAlloc's big reduction of remote accesses can be attributed to the following factors: its thread binding avoids unnecessary remote accesses; its metadata is placed on the local node, based on the binding design; its origin-aware memory allocation ensures locality of memory allocations. For TLB misses, NUMAlloc is orders of magnitude lower than other allocators (except TcMalloc) for pbzip2. Especially, the default allocator and jemalloc have 48× or 57× more TLB misses. Interestingly, the performance difference of pbzip2 is even smaller than fluidanimate, given the large difference in TLB misses. Based on our understanding, pbzip2 is an IO-bound application so that the computation difference does not have a large impact on its overall performance.

Overall, NUMAlloc either has fewer remote accesses or fewer TLB misses, which is the reason why it could have a better performance than other allocators on these applications.

Memory overhead is listed in the table, illustrated in FIG. 14. In total, NUMAlloc's memory consumption is around 12% more than that of the default Linux allocator, but it is similar to TcMalloc and is better than jemalloc and mimalloc. It is far better than Scalloc when THP is enabled. When only considering applications with a large footprint, over 500 MB, NUMAlloc introduces 10% memory overhead on average, which is also comparable to TcMalloc.

NUMAlloc's more memory consumption is mainly caused by its use of huge pages. When enabling transparent huge pages, an application will use 2 MB of physical memory even if it only allocates a small object (e.g., 8 bytes). As shown in the column of "w/o THP" of the table, when the transparent huge page support is disabled, NUMAlloc's memory overhead is actually comparable to Glibc and Intel TBB, where the total memory consumption is decreased from 15210 MB to 13364 MB. That is, NUMAlloc imposes a similar memory overhead when not using huge pages. We expect that NUMAlloc's memory consumption can be further reduced by utilizing some complicated mechanisms proposed by TEMERAIRE (TcMalloc).

The scalability with four synthetic applications from Hoard, including threadtest, larson, cache-scratch and cache-slash, which is also employed by existing work was evaluated. Among these applications, larson is to simulate a multithreaded server that could respond to requests from different clients, and threadtest is an application that performs a large number of allocations and deallocations within a specified number of threads. cache-scratch tests passive false sharing, and cache-thrash tests active false sharing. False sharing occurs when multiple threads are concurrently accessing different words in the same cache line. Passive false sharing is introduced upon deallocations, where a freed object can be utilized by another thread. In contrast, active false sharing is introduced during the initial allocations, where multiple continuous objects sharing the same cache line are allocated to different threads. The synthetic applications have a better scalability by design than other evaluated applications in the last section.

Figure 15:
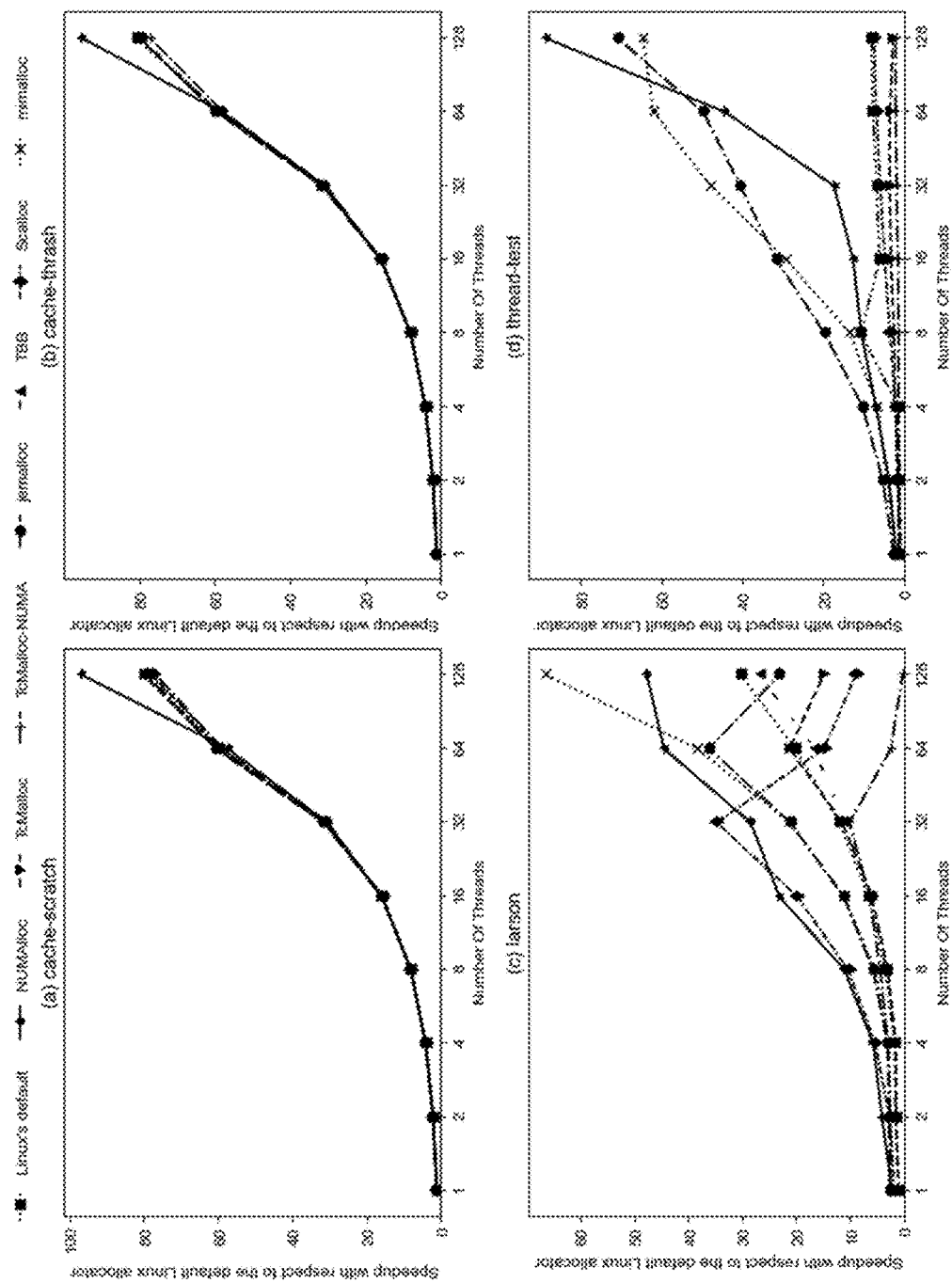
FIG. 15 shows four line charts illustrating scalability of performance a memory allocator designed according the present method and system compared to prior art memory allocators for synthetic application simulations (a) cache-scratch, (b) cache-thrash, (c) larson, and (d) thread-test.

In the evaluation, the number of threads on each node for NUMAlloc was maximized. For instance, the result of 32 threads will use 2 nodes, as each node has 16 cores. For other allocators, we only specify the number of threads, and it's up to the OS to perform the scheduling. The corresponding data is formatted in charts, illustrated in FIG. 15. All data are normalized to the data of one thread of the Linux's default allocator.

Overall, NUMAlloc has the best performance when the number of cores is 128. Its average speedup is 88×, comparing to the data of one thread of the Linux's allocator, while the second best allocator-mimalloc-only has 75× speedup. In contrast, the default Linux kernel only has the speedup of 49×. NUMAlloc also has the best scalability. When computing the speedup using the data of one thread of each allocator, NUMAlloc's average speedup is 65×, while the second best one only has 54×. All of these data indicates that NUMAlloc is scalable to 128 cores. Among these applications, cache-scratch tests passive false sharing, and cache-thrash tests active false sharing. False sharing occurs when multiple threads are concurrently accessing different words in the same cache line. Passive false sharing is introduced upon deallocations, where a freed object can be utilized by another thread. In contrast, active false sharing is introduced during the initial allocations, where multiple continuous objects sharing the same cache line are allocated to different threads. NUMAlloc will not introduce active false sharing, since each thread will get a page of objects initially. Although NUMAlloc might introduce passive false sharing due to its per-thread cache design, it avoids remote allocations across the node. Other allocators do not have such mechanisms. That is the reason why NUMAlloc is one of the best allocators for cache-scratch, and achieves much better speedup than all other allocators in cache-thrash (30% faster than the second-best one). TcMalloc has serious issues of both active and passive false sharing issue, which is the major reason that it does not perform well on these applications.

Figure 16:
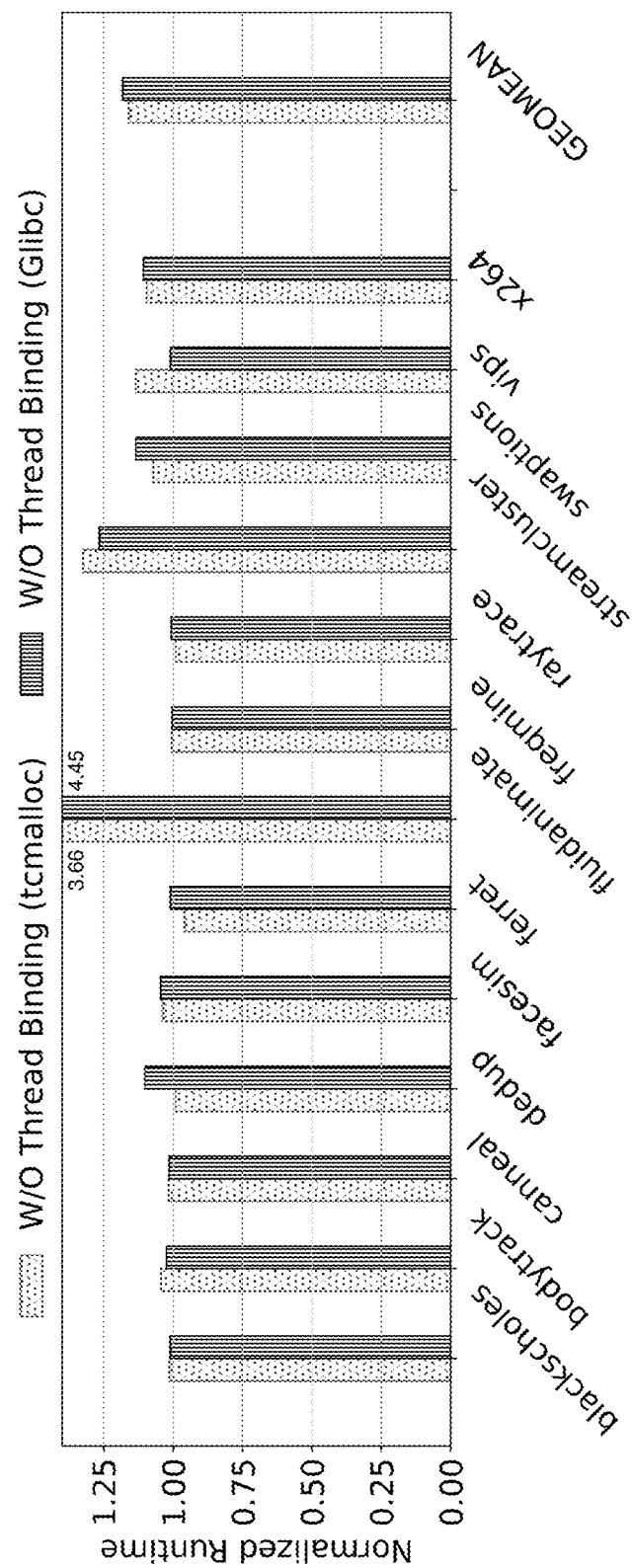
FIG. 16 shows a chart illustrating normalized performance without thread binding of TcMalloc and default Linux allocator.

FIG. 16 shows the performance difference with and without thread binding. The results are normalized to the data with thread binding of each allocator, respectively. We cannot evaluate NUMAlloc directly, since its mechanisms are tightened to thread binding, such as incremental sharing, origin-aware memory management and metadata allocation. Here we use the node-interleaved binding. As shown in FIG. 16, the thread binding improves the performance significantly for some applications. For instance, fluidanimate runs around 4.45× faster on Glibc and 3.66× faster on TcMalloc with the node-interleaved thread binding. Similarly, streamcluster runs around 20% and 30% faster than the corresponding one without the binding. This clearly indicates that the thread binding will benefit the performance overall, which should be included in the memory allocator by default.

Figure 17:
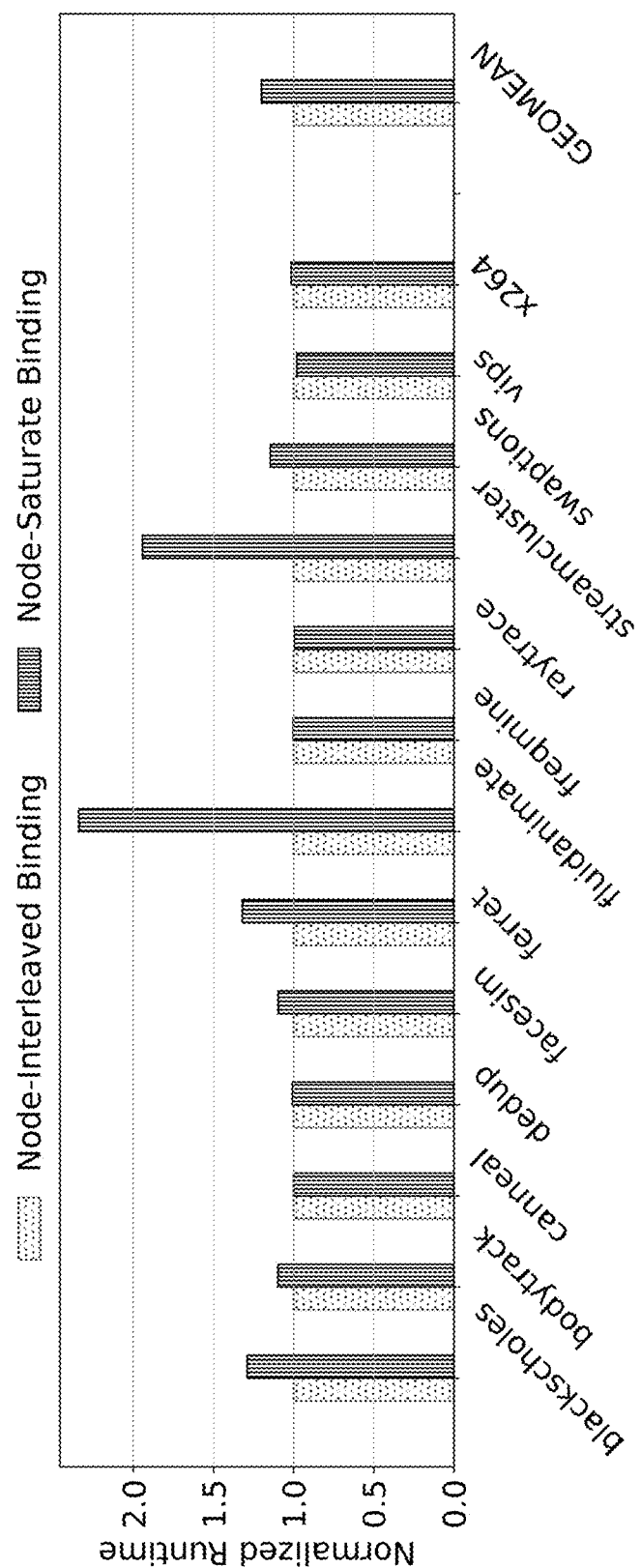
FIG. 17 shows a chart illustrating performance differences with node-interleaved binding and node-saturate binding of a memory allocator designed according the present method and system.

We further compare two types of thread binding: node-interleaved or node-saturate thread binding. In node-saturate binding, we bind the maximum possible number of threads (same as the number of cores) to a node and then switch to the next node. As shown in FIG. 17, the node-interleaved thread binding is almost always better than node-saturate thread binding, except for bodytrack. On average, node-interleaved binding is around 19% faster than node-saturate one for these evaluated applications. This indicates that people should use node-interleaved binding, if they would like to employ all hardware cores. However, if they only want to use partial cores, then the node-saturate binding could be a better choice. NUMAlloc allows users to adjust the binding option based on their needs.

Figure 18:
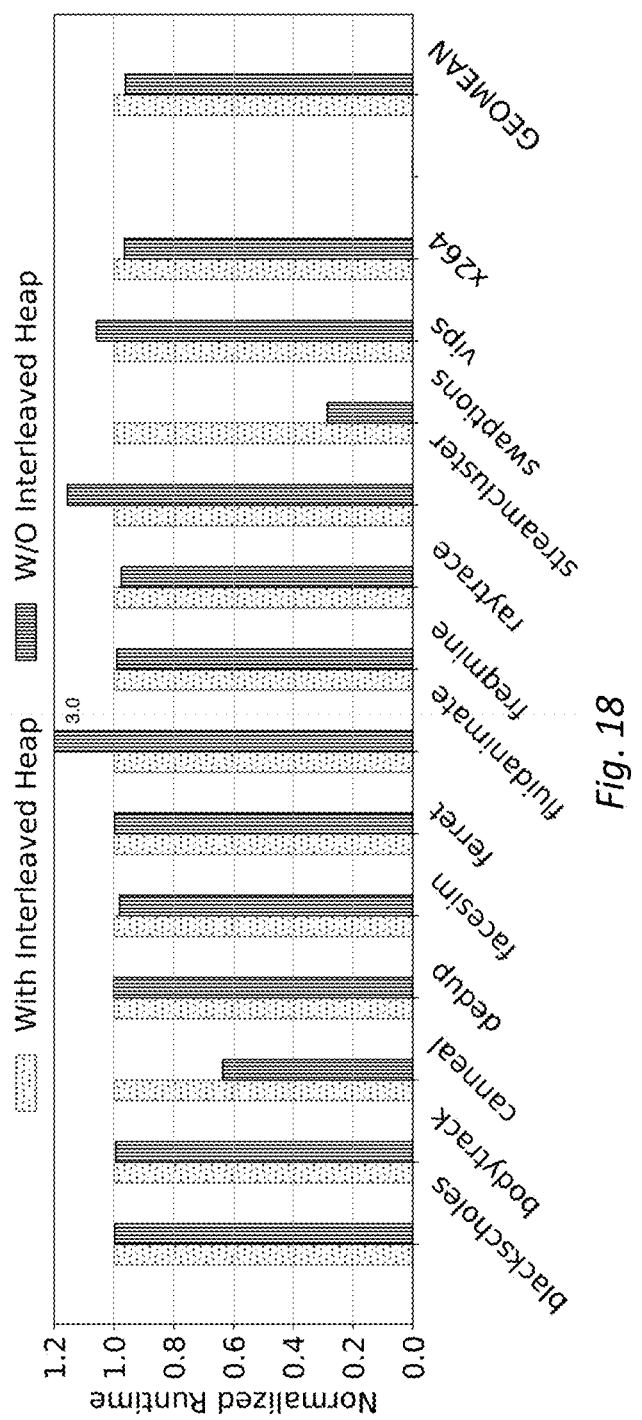
FIG. 18 shows a chart illustrating performance differences with and without the use of an interleaved heap of a memory allocator designed according the present method and system.

The potential benefit with the interleaved heap was also evaluated. The performance data is shown as FIG. 18. Based on the figure, we have the following conclusion: the interleaved heap will benefit (or at least has no harmful impact on) the performance for most applications. In particular, it improves the performance significantly on fluidanimate and streamcluster. However, applications having a large portion of time spent in the serial phase, such as canneal and raytrace, may hurt the performance with the interleaved heap support. These two applications share the same property that they have a larger portion of the first serial phase. With the interleaved heap, NUMAlloc allocates the memory from different nodes interleavedly for the serial phase, instead of from the local node (based on the default first-touch policy). That is, some private objects allocated in a remote node may introduce unnecessary performance overhead due to remote accesses.

Programmers can choose to enable or disable interleaved heap based on the applications. A simple metric is to use the portion of the serial phase inside multithreaded applications. For applications that are mostly running in the serial phase, turning off the interleaved heap support may be a better choice. That is, the interleaved heap will harm the serial execution, but may benefit the parallel execution because of its load balance. It is easy to turn on/off the interleaved heap via a compilation flag or the environment variable.

Figure 19:
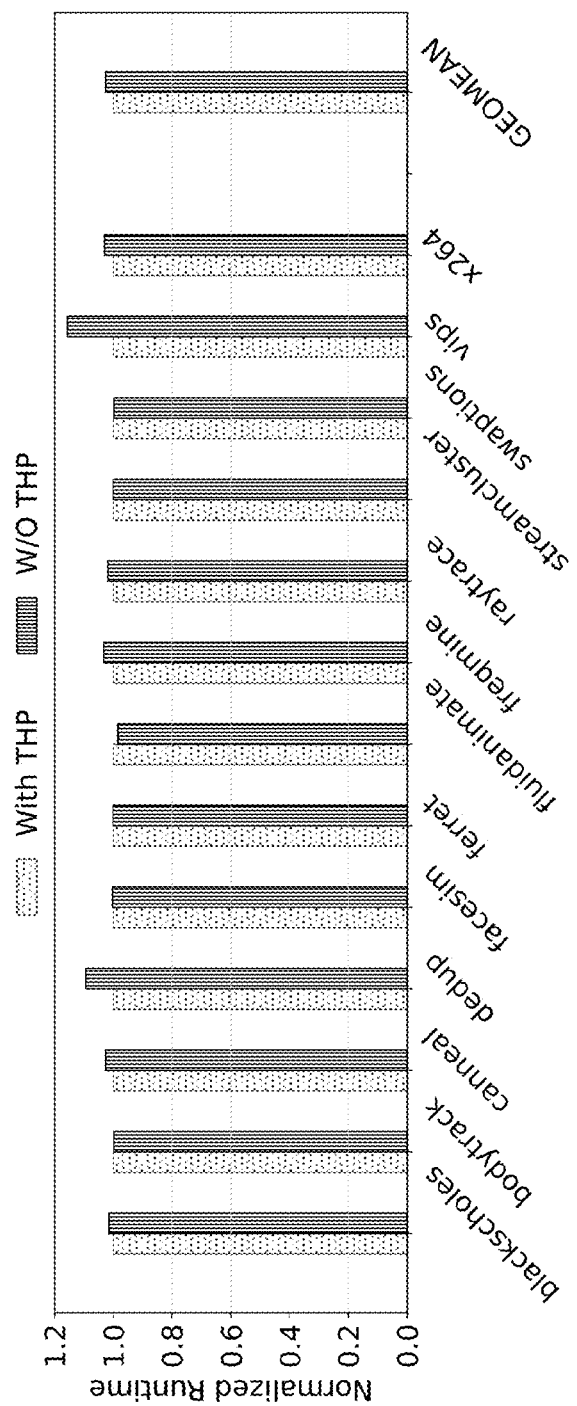
FIG. 19 shows a chart illustrating performance differences with and without use of selective huge pages of a memory allocator designed according the present method and system.

It's beneficial to embrace the transparent huge page support in modern systems and we evaluate the performance impact of transparent huge pages. The results are shown in FIG. 19. When integrating with transparent huge pages, NUMAlloc achieves significantly better performance for vips, where it is running 16% faster. On average, transparent huge pages improve the performance by about 2.62%. There are no applications that run slower with huge pages. This clearly indicates that it is beneficial to enable transparent huge pages for the NUMA architecture, especially when NUMAlloc is used. Although NUMAlloc may increase its memory overhead from 2% to 10% when using huge pages, as shown in FIG. 14, the memory overhead is still acceptable, given the hardware trend of increasing memory capacity.

NUMAlloc adopts an origin-aware deallocation that always returns the object to its original thread's or node's heap. We further verified the effect of this design and the results show that NUMAlloc runs 1.7% slower if we don't consider the origin of freed objects.

Accordingly, it can be seen that NUMAlloc is a memory allocator that is specially designed for the NUMA architecture. Applications can be linked to NUMAlloc directly, without the change of code and the recompilation. NUMAlloc is different from existing memory allocators, as it is the first binding-based allocator. It further proposes incremental sharing and origin-aware memory management to improve the locality. Based on our extensive evaluation, NUMAlloc achieves a significantly better performance than other popular allocators on the NUMA architecture, which is running 15% faster (and up to 6.8× faster) than the second-best allocator.

It would be appreciated by those skilled in the art that various changes and modifications can be made to the illustrated embodiments without departing from the spirit of the present invention. All such modifications and changes are intended to be within the scope of the present invention except as limited by the scope of the appended claims.

What is claimed is:

1. A computer-implemented method of facilitating memory management within a non-uniform memory computing ("NUMA") environment, the NUMA environment comprising a topology having a plurality of nodes, each of the plurality of nodes comprising a plurality of cores that can run multiple threads, the computer-implemented method comprising:
   determining the hardware topology of the NUMA computing environment to ascertain the relationship between each core and a memory of the NUMA computing environment;
   reserving a continuous range of memory for heap objects, the range of memory comprising a plurality of addressable memory pages;
   dividing the range of memory into an even number of blocks corresponding to the number of the plurality of nodes in the NUMA environment, and binding each block to each node; and
   managing memory allocations and deallocations together in order to ensure local allocations to each of the plurality of nodes for each thread; wherein said managing memory allocations and deallocations comprises intercepting a plurality of thread-creation requests from an operating system of the NUMA computing environment; and binding each of the plurality of thread-creation requests to each of the plurality of nodes.

2. The computer-implemented method of claim 1, wherein the step of managing memory allocations and deallocations further comprises:
   maintaining a per-thread freelist and a per-node freelist of heap objects that have been deallocated for each of said plurality of nodes, the per-node freelist further comprising a range of memory never allocated.

3. The computer-implemented method of claim 1, further comprising:
   reserving a continuous range of memory for shared objects; each range of memory comprising a plurality of addressable memory pages;
   interleavedly binding the plurality of addressable memory pages to the plurality of nodes; and
   maintaining a shared-object list of shared objects allocated in the range of memory of shared objects.

4. The computer-implemented method of claim 2, wherein the allocation of memory comprises:
   receiving an allocation request of memory from one thread running on the plurality of nodes of the NUMA environment;
   computing the size class of the memory allocation request received;
   checking the per-thread freelist for deallocated objects of the node requesting memory, and if not empty, allocating an object therefrom;
   if the per-thread freelist is empty, checking the per-node freelist for deallocated objects, and if not empty, moving at least a number of objects corresponding to the class size of the memory allocation request from the per-node freelist to the per-thread freelist; and
   if the per-node freelist is empty, allocating at least a number of objects corresponding to the class size of the memory allocation request from the never-allocated range of memory of the per-node freelist.

5. The computer-implemented method of claim 2, wherein the deallocation of memory comprises:
   receiving a deallocation request of memory for an object from one of the plurality of nodes of the NUMA environment;
   computing the origin of an object to be deallocated, and if not originating from the same node, adding this object to the per-node freelist of the node that the memory block is bound to;
   computing the origin of the object to be deallocated, and if originating from the same node, adding this object to the per-thread freelist; and
   checking the number of shared objects in the per-thread freelist of the node, and moving one or more shared objects from the per-thread freelist to the per-node freelist if the number exceeds a pre-defined threshold.

6. The computer-implemented method of claim 1, further comprising:
   wherein the step of binding each of the plurality of thread-creation requests to each of the plurality of nodes comprises binding each of the plurality of thread-creation requests to each of the plurality of nodes in one of a node-interleaved binding and node-saturated binding; and
   maintaining a balance of threads among the plurality of nodes.

7. The computer-implemented method of claim 3, further comprising:
   a) receiving an allocation request for memory from one thread running on one of the plurality of nodes of the NUMA environment;

b) determining whether the allocation request is for a shared object or a private object; and c) allocating memory from one of the range of memory for heap objects and the range of memory for shared objects based on the determination reached in step b).

8. The computer-implemented method of claim 1, further comprising:

allocating one of a plurality of transparent huge pages for an allocation request wherein threads bound to the same node of the plurality of nodes are bound to the same transparent huge page of the plurality of transparent huge pages; and storing metadata in addressable memory pages of the range of memory outside of the plurality of transparent huge pages.

9. A computer program product for facilitating processing within a non-uniform memory computing ("NUMA") environment, the NUMA environment comprising a topology having a plurality of nodes, each of the plurality of nodes comprising a plurality of cores that can run multiple threads, the computer program product comprising:

a non-transitory, computer readable storage medium readable by any one of the plurality of cores and storing instructions which, when executed, perform a method comprising:

determining the hardware topology of the NUMA computing environment to ascertain the relationship between each core and a memory of the NUMA computing environment;

reserving a continuous range of memory for heap objects, the range of memory comprising a plurality of addressable memory pages;

dividing the range of memory into an even number of blocks corresponding to the number of the plurality of nodes in the NUMA environment, and binding each block to each node;

managing memory allocations and deallocations together in order to ensure local allocations to each of the plurality of nodes for each thread; wherein said step of managing memory allocations and deallocations comprises intercepting a plurality of thread-creation requests from an operating system of the NUMA computing environment; and binding each of the plurality of thread-creation requests to each of the plurality of nodes.

10. The computer program product of claim 9, wherein the instructions for the step of managing memory allocations and deallocations further comprises:

maintaining a per-thread freelist and a per-node freelist of heap objects that have been deallocated for each of said plurality of nodes, the per-node freelist further comprising a range of memory never allocated.

11. The computer program product of claim 9, wherein the instructions for the step of managing memory allocations and deallocations further comprises:

reserving a continuous range of memory for shared objects; each range of memory comprising a plurality of addressable memory pages;

interleavedly binding the plurality of addressable memory pages to the plurality of nodes; and maintaining a shared-object list of shared objects allocated in the range of memory of shared objects.

12. The computer program product of claim 10, wherein the instructions for the step of allocation of memory comprises:

receiving an allocation request of memory from one thread running on the plurality of nodes of the NUMA environment;

computing the size class of the memory allocation request received;

checking the per-thread freelist for deallocated objects of the node requesting memory, and if not empty, allocating an object therefrom;

if the per-thread freelist is empty, checking the per-node freelist for deallocated objects, and if not empty, moving at least a number of objects corresponding to the class size of the memory allocation request from the per-node freelist to the per-thread freelist; and if the per-node freelist is empty, allocating at least a number of objects corresponding to the class size of the memory allocation request from the never-allocated range of memory of the per-node freelist.

13. The computer program product of claim 10, wherein the instructions for the step of deallocation of memory comprises:

receiving a deallocation request of memory for an object from one of the plurality of nodes of the NUMA environment;

computing the origin of an object to be deallocated, and if not originating from the same node, adding this object to the per-node freelist of the node that the memory block is bound to;

computing the origin of the object to be deallocated, and if originating from the same node, adding this object to the per-thread freelist; and checking the number of shared objects in the per-thread freelist of the node, and moving one or more shared objects from the per-thread freelist to the per-node freelist if the number exceeds a pre-defined threshold.

14. The computer program product of claim 9, where in the instructions for the method further comprises:

wherein the step of binding each of the plurality of thread-creation requests to each of the plurality of nodes comprises binding each of the plurality of thread-creation requests to each of the plurality of nodes in one of a node-interleaved binding and node-saturated binding; and maintaining a balance of threads among the plurality of nodes.

15. A computer system for facilitating processing within a non-uniform memory computing ("NUMA") environment, the computer comprising:

a plurality of nodes, each node comprising a memory, a memory controller connected to the memory, and a plurality of cores that can run multiple threads connected to the memory controller, the plurality of nodes and plurality of cores organized into a topology; and a computer readable storage medium readable by anyone of the plurality of cores and storing instructions which, when executed, perform a method comprising:

determining the hardware topology of the NUMA computing environment to ascertain the relationship between each core and the memory of the NUMA computing environment;

reserving a continuous range of memory for heap objects, the range of memory comprising a plurality of addressable memory pages;

dividing the range of memory into an even number of blocks corresponding to the number of the plurality of nodes in the NUMA environment, and binding each block to each node;

managing memory allocations and deallocations together in order to ensure local allocations to each of the plurality of nodes for each thread; wherein said step of managing memory allocations and deallocations comprises intercepting a plurality of thread-creation requests from an operating system of the NUMA computing environment; and binding each of the plurality of thread-creation requests to each of the plurality of nodes.

16. The computer system of claim 15, wherein the instructions for the step of managing memory allocations and deallocations further comprises:
maintaining a per-thread freelist and a per-node freelist of heap objects that have been deallocated for each of said plurality of nodes, the per-node freelist further comprising a range of memory never allocated.

17. The computer system of claim 15, wherein the instructions for the step of managing memory allocations and deallocations further comprises:
reserving a continuous range of memory for shared objects; each range of memory comprising a plurality of addressable memory pages;
interleavedly binding the plurality of addressable memory pages to the plurality of nodes; and
maintaining a shared-object list of shared objects allocated in the range of memory of shared objects.

18. The computer system of claim 16, wherein the instructions for the step of allocation of memory comprises:
receiving an allocation request of memory from one thread running on the plurality of nodes of the NUMA environment;
computing the size class of the memory allocation request received;
checking the per-thread freelist for deallocated objects of the node requesting memory, and if not empty, allocating an object therefrom;
if the per-thread freelist is empty, checking the per-node freelist for deallocated objects, and if not empty, moving at least a number of objects corresponding to the class size of the memory allocation request from the per-node freelist to the per-thread freelist; and
if the per-node freelist is empty, allocating at least a number of objects corresponding to the class size of the memory allocation request from the never-allocated range of memory of the per-node freelist.

19. The computer system of claim 16, wherein the instructions for the step of deallocation of memory comprises:
receiving a deallocation request of memory for an object from one of the plurality of nodes of the NUMA environment;
computing the origin of an object to be deallocated, and if not originating from the same node, adding this object to the per-node freelist of the node that the memory block is bound to;
computing the origin of the object to be deallocated, and if originating from the same node, adding this object to the per-thread freelist; and
checking the number of shared objects in the per-thread freelist of the node, and moving one or more shared objects from the per-thread freelist to the per-node freelist if the number exceeds a pre-defined threshold.

20. The computer system of claim 15, where in the instructions for the method further comprises:
wherein the step of binding each of the plurality of thread-creation requests to each of the plurality of nodes comprises binding each of the plurality of thread-creation requests to each of the plurality of nodes in one of a node-interleaved binding and node-saturated binding; and
maintaining a balance of threads among the plurality of nodes.

* * * * *